(12) United States Patent
Schipper et al.

(10) Patent No.: US 11,492,541 B2
(45) Date of Patent: Nov. 8, 2022

(54) ORGANIC SALTS OF OXIDIZING ANIONS AS ENERGETIC MATERIALS

(71) Applicant: Saudi Arabian Oil Company, Dhahran (SA)

(72) Inventors: Desmond Schipper, Houston, TX (US); Katherine Leigh Hull, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 50 days.

(21) Appl. No.: 16/709,533

(22) Filed: Dec. 10, 2019

(65) Prior Publication Data

US 2021/0024812 A1   Jan. 28, 2021

Related U.S. Application Data

(60) Provisional application No. 62/878,060, filed on Jul. 24, 2019.

(51) Int. Cl.

| | | |
|---|---|---|
| C09K 8/80 | (2006.01) | |
| C09K 8/68 | (2006.01) | |
| C09K 8/70 | (2006.01) | |
| C09K 8/66 | (2006.01) | |
| E21B 43/26 | (2006.01) | |
| E21B 37/06 | (2006.01) | |
| E21B 41/02 | (2006.01) | |

(52) U.S. Cl.
CPC ............... *C09K 8/68* (2013.01); *C09K 8/665* (2013.01); *C09K 8/703* (2013.01); *C09K 8/706* (2013.01); *C09K 8/80* (2013.01); *E21B 43/26* (2013.01); *E21B 37/06* (2013.01); *E21B 41/02* (2013.01)

(58) Field of Classification Search
CPC . C09K 8/68; C09K 8/665; C09K 8/80; C09K 8/703; C09K 8/706; C09K 8/035; C09K 2208/26; C09K 8/594; E21B 43/26; E21B 37/06; E21B 41/02; E21B 43/263; Y02P 20/54; C06B 49/00
See application file for complete search history.

(56) References Cited

U.S. PATENT DOCUMENTS

| | | |
|---|---|---|
| 830,437 A | 9/1906 | Humphrey |
| 2,900,269 A | 8/1959 | Bauman et al. |
| 3,284,281 A | 11/1966 | Thomas |
| 3,716,387 A | 2/1973 | Simmons et al. |
| 3,807,557 A | 4/1974 | Miller |
| 3,926,575 A | 12/1975 | Meyers |
| 3,996,062 A | 12/1976 | Frost |
| 4,043,885 A | 8/1977 | Yen et al. |
| 4,047,988 A | 9/1977 | Weill |
| 4,220,550 A | 9/1980 | Frenier et al. |
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,587,739 A | 5/1986 | Holcomb |
| 4,594,170 A | 6/1986 | Brown et al. |
| 4,640,692 A | 2/1987 | Audeh |
| 4,681,914 A | 7/1987 | Olson et al. |
| 4,830,773 A | 5/1989 | Olson |
| 4,830,779 A | 5/1989 | Maeno et al. |
| 4,864,472 A | 9/1989 | Yoshimura |
| 5,193,396 A | 3/1993 | Gorski |
| 5,213,705 A | 5/1993 | Olson |
| 5,302,297 A | 4/1994 | Barthrope |
| 5,435,187 A | 7/1995 | Ewy |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,095,679 A | 8/2000 | Hammiche et al. |
| 6,138,760 A | 10/2000 | Lopez et al. |
| 6,165,295 A | 12/2000 | Wagaman |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |

(Continued)

FOREIGN PATENT DOCUMENTS

| | | |
|---|---|---|
| CN | 101819111 | 12/2011 |
| CN | 1621803 | 5/2012 |

(Continued)

OTHER PUBLICATIONS

H. Nakayama, Hydrates of organic compounds. VII. The effect pf anions on the formation of clathrate hydrates of tetrabutylammonium salts, Bull. Chem. Soc. Jpn, 56, 1983, 877-880.*
Document 1 (https://digital.sciencehistory.org/works/sb3978792 May 19, 2021 downloaded on May 19, 2021).*
B. Zhao, et al, Tracer eluting proppants for shale fracturing, URTeC:478, 2019.*
Document (https://en.wikipedia.org/wiki/Anhydrous downloaded on Mar. 3, 2022).*
"Field-Deployable Solution for Nanoporosity Measurements in Mud Logging Operations and a Novel Method for Fracability Analysis Using Mud Cuttings," Agilent Technologies, Oct. 2013, 44 pages.

(Continued)

*Primary Examiner* — Kumar R Bhushan
(74) *Attorney, Agent, or Firm* — Fish & Richardson P.C.

(57) ABSTRACT

This document relates to energetic salts that contain an organic cation and an oxidizing anion and methods of using the energetic salt compositions, including methods of hydraulic fracturing, pressure pulse fracturing, formation damage removal, and lowering the viscosity of heavy oil.

47 Claims, 3 Drawing Sheets

(56) References Cited

U.S. PATENT DOCUMENTS

| | | | |
|---|---|---|---|
| 6,729,409 B1 | 5/2004 | Gupta et al. |
| 6,749,022 B1 | 6/2004 | Fredd |
| 6,846,420 B2 | 1/2005 | Reddy et al. |
| 6,866,048 B2 | 3/2005 | Mattox |
| 6,947,843 B2 | 9/2005 | Fisher et al. |
| 6,989,391 B2 | 1/2006 | Funkhouser |
| 7,086,484 B2 | 8/2006 | Smith |
| 7,098,663 B1 | 8/2006 | Bader |
| 7,261,158 B2 | 8/2007 | Middaugh et al. |
| 7,344,889 B2 | 3/2008 | Kelemen et al. |
| 7,369,980 B2 | 5/2008 | Deffenbaugh et al. |
| 7,500,517 B2 | 3/2009 | Looney et al. |
| 7,526,418 B2 | 4/2009 | Pita et al. |
| 7,565,831 B2 | 7/2009 | Miyahara |
| 7,588,085 B2 | 9/2009 | Acock et al. |
| 7,621,173 B2 | 11/2009 | Hsu |
| 7,645,883 B1 | 1/2010 | Hawkins et al. |
| 7,654,159 B2 | 2/2010 | Enoksson |
| 7,771,549 B1 | 8/2010 | Christe et al. |
| 7,789,164 B2 | 9/2010 | Looney et al. |
| 7,857,055 B2 | 12/2010 | Li |
| 7,921,911 B2 | 4/2011 | Fuller et al. |
| 7,983,845 B2 | 7/2011 | Minh |
| 8,104,536 B2 | 1/2012 | Looney et al. |
| 8,165,817 B2 | 4/2012 | Betancourt et al. |
| 8,177,422 B2 | 5/2012 | Kjoller et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,473,213 B2 | 6/2013 | Zhu et al. |
| 8,701,788 B2 | 4/2014 | Wigand et al. |
| 8,729,903 B2 | 5/2014 | Smka et al. |
| 8,763,703 B2 | 7/2014 | Saini et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,936,089 B2 | 1/2015 | Wigand |
| 9,006,153 B2 | 4/2015 | Lin et al. |
| 9,033,043 B2 | 5/2015 | Hinkel |
| 9,057,797 B2 | 6/2015 | Omeragic et al. |
| 9,128,210 B2 | 9/2015 | Pomerantz |
| 9,133,398 B2 | 9/2015 | Wigand et al. |
| 9,152,745 B2 | 10/2015 | Glinsky |
| 9,664,018 B2 | 5/2017 | Vandeponseele et al. |
| 9,688,904 B2 | 6/2017 | Wang et al. |
| 9,696,270 B1 | 7/2017 | Roy et al. |
| 9,753,016 B1 | 9/2017 | Daugela |
| 9,784,882 B2 | 10/2017 | Vinegar et al. |
| 9,834,721 B2 | 12/2017 | Chang et al. |
| 9,863,211 B2 | 1/2018 | Gamage et al. |
| 9,863,231 B2 | 1/2018 | Hull et al. |
| 9,869,649 B2 | 1/2018 | Hull et al. |
| 9,885,691 B1 | 2/2018 | Daugela |
| 9,921,178 B2 * | 3/2018 | Larsen ............... G01N 33/0036 |
| 10,066,149 B2 | 9/2018 | Li et al. |
| 10,113,396 B2 | 10/2018 | Nelson et al. |
| 10,151,715 B2 | 12/2018 | Hull et al. |
| 10,273,398 B2 | 4/2019 | Liu et al. |
| 10,329,478 B2 | 6/2019 | Schnoor et al. |
| 10,351,758 B2 | 7/2019 | Hull et al. |
| 10,379,068 B2 | 8/2019 | Hull et al. |
| 2005/0060130 A1 | 3/2005 | Shapiro et al. |
| 2005/0103118 A1 | 5/2005 | Workman |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0087940 A1 | 4/2007 | Qu et al. |
| 2007/0203677 A1 | 8/2007 | Awwiller |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0193881 A1 | 8/2009 | Finnberg |
| 2009/0248309 A1 | 10/2009 | Nelville et al. |
| 2009/0313772 A1 | 12/2009 | Talley |
| 2010/0010106 A1 | 1/2010 | Crews |
| 2010/0049625 A1 | 2/2010 | Biebesheimer et al. |
| 2010/0051511 A1 | 3/2010 | Faerman |
| 2010/0186520 A1 | 7/2010 | Wheeler |
| 2010/0213579 A1 | 8/2010 | Henry |
| 2010/0224365 A1 | 9/2010 | Abad |
| 2010/0258265 A1 | 10/2010 | Karanikas et al. |
| 2010/0276142 A1 | 11/2010 | Skildum et al. |
| 2010/0279136 A1 | 11/2010 | Bonucci |
| 2011/0257944 A1 | 10/2011 | Du et al. |
| 2011/0259588 A1 | 10/2011 | Ali |
| 2012/0026037 A1 | 2/2012 | Thomson et al. |
| 2012/0193578 A1 | 8/2012 | Pan |
| 2012/0247774 A1 | 10/2012 | Li et al. |
| 2012/0261617 A1 | 10/2012 | Pan et al. |
| 2013/0013209 A1 | 1/2013 | Zhu et al. |
| 2013/0056213 A1 | 3/2013 | Medvedev et al. |
| 2013/0084643 A1 | 4/2013 | Commarieu et al. |
| 2013/0137610 A1 | 5/2013 | Huang |
| 2013/0160994 A1 | 6/2013 | Alsop et al. |
| 2013/0161002 A1 | 6/2013 | Wigand |
| 2013/0213120 A1 | 8/2013 | Lebedev |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0269933 A1 | 10/2013 | Pomerantz et al. |
| 2014/0008305 A1 | 1/2014 | Nichols et al. |
| 2014/0045732 A1 | 2/2014 | Mazyar |
| 2014/0048694 A1 | 2/2014 | Pomerantz |
| 2014/0116710 A1 | 5/2014 | Naser-El-Din et al. |
| 2014/0231077 A1 | 8/2014 | Rivero et al. |
| 2014/0251605 A1 | 9/2014 | Hera |
| 2014/0260694 A1 | 9/2014 | Szlendak |
| 2014/0374104 A1 | 12/2014 | Kushal |
| 2015/0075782 A1 | 3/2015 | Sharma |
| 2015/0152724 A1 | 6/2015 | Amendt |
| 2015/0293256 A1 | 10/2015 | Dusterhoft |
| 2016/0103047 A1 | 4/2016 | Liu |
| 2016/0103049 A1 | 4/2016 | Liu |
| 2016/0177698 A1 * | 6/2016 | Schultheiss ............. E21B 49/00 166/250.1 |
| 2016/0362965 A1 | 12/2016 | Parlar |
| 2017/0066959 A1 | 3/2017 | Hull |
| 2017/0067836 A1 | 3/2017 | Hull et al. |
| 2017/0336528 A1 | 11/2017 | Badri et al. |
| 2017/0350244 A1 * | 12/2017 | Hall ........ C09K 8/805 |
| 2017/0370197 A1 | 12/2017 | Han et al. |
| 2018/0112126 A1 | 4/2018 | Yang et al. |
| 2018/0195982 A1 | 7/2018 | Hull et al. |
| 2018/0237685 A1 * | 8/2018 | Nguyen ................ C09K 8/703 |
| 2019/0211658 A1 | 7/2019 | Hull et al. |

FOREIGN PATENT DOCUMENTS

| | | |
|---|---|---|
| CN | 102183410 | 5/2014 |
| CN | 105445440 | 3/2016 |
| EP | 247669 | 12/1987 |
| EP | 2480625 | 4/2013 |
| EP | 2480626 | 4/2013 |
| WO | WO 9728098 | 8/1997 |
| WO | WO 2002064702 | 8/2002 |
| WO | WO 2004005435 | 1/2004 |
| WO | WO 2008001218 | 1/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012087887 | 6/2012 |
| WO | WO 2012087898 | 6/2012 |
| WO | WO 2012171857 | 12/2012 |
| WO | WO 2013149122 | 10/2013 |

(56) References Cited

FOREIGN PATENT DOCUMENTS

| WO | WO 2015097116 | 7/2015 |
|---|---|---|
| WO | WO 2015126082 | 8/2015 |
| WO | WO 2015181028 | 12/2015 |
| WO | WO 2015200060 | 12/2015 |
| WO | WO 2017/040834 | 3/2017 |
| WO | WO 2017040824 | 3/2017 |
| WO | WO 2017/086975 | 5/2017 |
| WO | WO 2017136641 | 8/2017 |

OTHER PUBLICATIONS

Abad et al., "Evaluation of the Material Properties of the Multilayered Oxides formed on HCM12A using New and Novel Techniques," Manuscript Draft, Manuscript No. OXID-D-15-00019, published in 2015, 44 pages.
Abousleiman et al, "A Micromechanically Consistent Poroviscoelasticity Theory for Rock Mechanics Applications," Int. J. Rock Mech. Min. Sci. & Geomech. Abstr., vol. 30, No. 7, published in 1993, 4 pages.
Abousleiman et al, "Anisotropic Porothermoelastic Solution and Hydro-Thermal Effects on Fracture Width in Hydraulic Fracturing," Int. J. Numer. Anal. Meth. Geomech., published in 2013, 25 pages.
Abousleiman et al, "Poroviscoelastic Analysis of Borehole and Cylinder Problems," ACTA Mechanica, vol. 119, published in 1996, 21 pages.
Abousleiman et al, "SPE 110120: Geomechanics Field and Laboratory Characterization of Woodford Shale: The Next Gas Play," SPE International, SPE 110120, presented at the 2007 SPE Annual Technical Conference and Exhibition on Nov. 11-14, 2007, 14 pages.
Abousleiman et al, "The Granular and Polymer Nature of Kerogen Rich Shale," Acta Geotechnica 2016, 11 (3), pp. 573-594, 22 pages.
Abousleiman et al., "GeoGenome Industry Consortium (G2IC)," JIP, 2004-2006, 6 pages.
Abousleiman et al., "Geomechanics Field Characterization of the Two Prolific U.S. Mid-West Gas Plays with Advanced Wire-Line Logging Tools," SPE International, SPE 124428, presented at 2009 SPE Annual Technical Conference and Exhibition, Oct. 4-7, 2009, 19 pages.
Abousleiman et al., "Geomechanics field characterization of Woodford Shale and Barnett Shale with advanced logging tools and nano-indentation on drill cuttings," The Leading Edge, Jun. 2010, 6 pages.
Abousleiman et al., "Mandel's Problem Revisited," Geotechnique, 46, No. 2, published in 1996, 9 pages.
Abousleiman et al., "Mechanical Characterization of Small Shale Samples subjected to Fluid Exposure using the Inclined Direct Shear Testing Device," Int. J. Rock Mech. & Min. Sci., vol. 47, No. 3, published in 2010, 13 pages.
Abousleiman et al., "Poroelastic Solutions in Transversely Isotropic Media for Wellbore and Cylinder," Int. J. Solids Structures, vol. 35, Nos. 34-35, published in 1998, 25 pages.
Agenet et al., "SPE 157019: Fluorescent Nanobeads: a First Step Toward Intelligent Water Tracers," Society of Petroleum Engineers, SPE International Oilfield Nanotechnology conference, Jun. 12-14, 2012, 13 pages.
Allan et al., "A Multiscale Methodology for the Analysis of Velocity Anisotropy in Organic-Rich Shale," Geophysics, vol. 80, No. 4, Jul.-Aug. 2015, 16 pages.
Altowairqi, "Shale elastic property relationships as a function of total organic carbon content using synthetic samples," Journal of Petroleum Science and Engineering vol. 133, Sep. 2015, 9 pages.
Ananthan et al., "Influence of Strain Softening on the Fracture of Plain Concrete Beams," Int. J. of Fracture, vol. 45, published in 1990, 25 pages.
Anisimov, "SPE 118862: The Use of Tracers for Reservoir Characterization," Society of petroleum Engineers (SPE), presented at SPE Middle East Oil and Gas Show and Conference, Mar. 15-18, 2009, 8 pages.
Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.
Ballice, "Solvent Swelling Studies of Goynuk (Kerogen Type-I) and Beypazari Oil Shales (Kerogen Type-II)," Science Direct, Fuel vol. 82, published in 2003, 5 pages.
Bazant et al., "Deformation of Progressively Cracking Reinforced Concrete Beams," ACI Journal. Technical Paper, Title No. 81-26, vol. 81, No. 3, May-Jun. 1984, 11 pages.
Bazant et al., "Size Effect in Brazilian Split-Cylinder Tests: Mesurements and Fracture Analysis," ACI Materials Journal, vol. 88, No. 3, May 31, 1991; pp. 325-332.
Bazant et al., "Strain-Softening Bar and Beam: Exact Non-Local Solution," Int. J. Solids Structures, vol. 24, No. 7, published in 1988, 15 pages.
Bennett et al., "Instrumented Nanoindentation and 3D Mechanistic Modeling of a Shale at Multiple Scales," Acta Geotechnica, vol. 10, No. 21, Jan. 9, 2015; 14 pages.
Bhandari et al., "Two-Dimensional DEM Analysis of Behavior of Geogrid-Reinforced Uniform Granular Bases under a Vertical Cyclic Load, Acta Geotechnica," published in 2014, 12 pages.
Biot et al., "Temperature analysis in hydraulic fracturing," Journal of Petroleum Technology, vol. 39, No. 11, Nov. 1987, 9 pages.
Biot, "General Theory of Three-Dimensional Consolidation," Journal of Applied Physics, vol. 12, No. 2, Feb. 1941, 11 pages.
Bisnovat et al., "Mechanical and petrophysical behavior of organic-rich chalk from the Judea Plains, Israel," Marine and Petroleum Geology, vol. 64, Jun. 2015, 13 pages.
Bobko et al., "Tire Nanogranular Origin of Friction and Cohesion in Shale—A Strength Homogenization Approach to Interpretation of Nanoindentation Results," Int. J. Numer. Anal. Meth. Geomech., published in 2010, 23 pages.
Boskey et al., "Perspective—Collagen and Bone Strength," Journal of Bone and Mineral Research, vol. 14, No. 3, published in 1999, 6 pages.
Brochard et al., "Fracture Properties of Kerogen and Importance for Organic-Rich Shales," Annual World Conference on Carbon (Carbon 2013), Jul. 2013, 5 pages.
Bunzil et al., "Taking advantage of luminescent lanthanide ions," Chemical Society Reviews, Dec. 2005, 29 pages.
Cahill et al., "Nanoscale Thermal Transport II," Applied Physics Reviews 1.1, 2014, 46 pages.
Cahill et al., "Nanoscale thermal transport," Journal of applied physics vol. 93, No. 2, Jan. 2003, 28 pages.
Carcione and Avseth, "Rock-physics templates for clay-rich source rocks," Geophysics vol. 80, Issue 5, D481-D500, Sep. 2015, 21 pages.
Carter and Hanson, "Fake Moon Dirt, HOOD Solar System Science," UT Dallas Magazine, vol. 6, Issue 2, Spring 2016, 1 page.
Chang et al., "Magnetic SERS Composite Nanoparticles for Microfluidic Detection," 251st ACE National Meeting, Mar. 13-17, 2016, 1 pages.
Chen et al., "Size Effect in Micro-Scale Cantilever Beam Bending,"Acta Mech., published in 2011, 17 pages.
Chen et al., "FITC functionalized magnetic core-shell $Fe_3O_4$/Ag hybrid nanoparticie for selective determination of molecular biothiols," Elsevier Ltd., Dec. 2013, 7 pages.
Chern et al., "Deformation of Progressively Cracking Partially Prestressed Concrete Beams," PCI Journal, vol. 37, No. 1, published in 1992, 11 pages.
Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.
Chupin et al., "Finite Strain Analysis of Nonuniform Deformation Inside Shear Bands in Sands," Int. J. Numer. Anal. Meth. Geomech., published in 2012, 16 pages.
Corapcioglu, "Fracturing Fluid Effects on Young's Modulus and Embedment in the Niobrara Formation," Thesis for degree of Master of Science (Petroleum Engineering), Colorado School of Mines, 2014, 189 pages.
Cubillos et al., "SPE 174394-MS: The Value of Inter-well and Single Well Tracer Technology for De-Risking and Optimizing a

(56) References Cited

OTHER PUBLICATIONS

CEOR Process—Caracara Field Case," Society of Petroleum Engineers (SPE), presented at EUROPEC 2015, Jun. 1-4, 2015, 19 pages.

Custelcean et al., "Aqueous Sulfate Separation by Crystallization of Sulfate-Water Clusters," Angew. Chem. Int. Ed., published in 2015, vol. 54, pp. 10525-10529.

Daneshy, "Hydraulic Fracturing to Improve Production." Tech 101, TheWayAhead, vol. 6, No. 3, Oct. 2016, 4 pages.

Das et al., "Molecular Fluorescence, Phosphorescence, and Chemiluminescence Spectrometry," Analytical Chemistry, Nov. 3, 2011, 29 pages.

De Block et al., "SPE-177601-MS: A New Solution for the Characterization of Unconventional Shale Resources Based on Analysis or Drill Cutting," SPE International, presented at the Abu Dhabi International Petroleum Exhibition and Conference, Nov. 9-12, 2015, 6 pages.

De Rocha et al, "Concentrated CO2-in-Water Emulsions with Nonionic Polymeric Surfactants," J. Colloid Interface Sci. 2001 239 (1), pp. 241-253, 13 pages.

Deans, "SPE 7076: Using Chemical Tracers To Measure Fractional Flow And Saturation In-Situ," Society of Petroleum Engineers (SPE), presented at SPE Symposium on improved Methods of Oil Recovery, Apr. 16-17, 1978, 10 pages.

Deirieh et al., "Nanochemomechanical Assessment of Shale: A Coupled WDS-Indentation Analysis," Acta Geotechnica, published in 2012, 25 pages.

Delafargue and Ulm, "Explicit approximations of the indentation modulus of elastically orthotropic solids for conical indenters," International Journal of Solids and Structures vol. 41, Issue 26, Dec. 2004, 10 pages.

Devarapalli et al., "Micro-CT and FIB-SEM imaging and pour structure characterization of dolomite rock at multiple scales," Arabian Journal of Geosciences, Aug. 2017, 9 pages.

Du et al., "SPE 93140: Interwell Tracer Tests: Lessons Learnted from past Field Studies," Society of Petroleum Engineers (SPE), presented at SPE Asia Pacific Oil and Gas Conference and Exhibition, Apr. 5-7, 2005, 9 pages.

Eastoe et al., "Water-in-CO2 Microemulsions Studied by Small-Angle Neutron Scattering," Langmuir 1997, 13(26), pp. 6980-6984, 5 pages.

Ehlig-Economides and Economides, "Water as Poppant," SPE-147603, presented at the SPE Annual Technical Conference and Exhibition, Oct. 30-Nov. 2, 2011, 8 pages.

Ekbote et al., "Porochemoelastic Solution for an Inclided Borehole in a Transversely Isotropic Formation," J. of Eng. Mech., ASCE, Jul. 2006, 10 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al, "Mechanical Properties of organic matter in shales mapped at the nanometer scale", Marine and Petroleum Geology, vol. 59, pp. 294-304, Sep. 18, 2014, 11 pages.

Ertas et al., "Petroleum Expulsion Part 1. Theory of Kerogen Swelling in Multicomponent Solvents," Energy & Fuels, published in 2006, 6 pages.

Eseme et al., "Review of mechanical properties of oil shales: implications for exploitation and basin modeling," Oil Shale, vol. 24, No. 2, Jan. 2007, 16 pages.

Esfahani et al., "Quantitative nanoscale mapping of three-phase thermal conductivities in filled skutterudites via scanning thermal microscopy," Nature Science Review, vol. 5. Issue 1, Feb. 2017, 31 pages.

Ewy, "Shale Swelling/Shrinkage and Water Content Change due to Imposed Suction and Due to Direct Brine Contact," Acta Geotechnica, published in 2014, 18 pages.

Frazer et al., "Localized Mechanical Property Assessment of SiC/ SiC Composite Materials," Science Direct, Part A 70, published in 2015, 9 pages.

Ganjdanesh et al. "Treatment of Condensate and Water Blocks in Hydraulic-Fractured Shale-Gas/Condensate Reservoirs," SPE-175145, presented at the SPE Annual Technical Conference and Exhibition, Sep. 28-30, 2015, published in SPE Journal, Apr. 2016, 10 pages.

Gao et al., "Materials Become Insensitive to Flaws at Nanoscale: Lessons from Nature," PNAS, vol. 100, No. 10, May 13, 2003, 628 pages.

Gardiner et al., "Practical Raman Spectroscopy," Springer-Verlag, 1989, 9 pages.

Garnero, "The Contribution of Collagen Crosslinks to Bone Strength," Int. Bone & Mineral Society, Sep. 2012, 8 pages.

Georgi et al., "Physics and Chemistry in Nanoscale Rocks", Mar. 22-26, 2015, La Jolla, California, USA, SPE Forum Series; 4 pages.

Glossary.oilfield.slb.com' [online], "Oilfield Glossary: fluid-friction reducer," available on or before Jun. 15, 2017, retrieved from URL<http://www.glossary.oilfield.slb.com/Terms/f/fluid-friction reducer. aspx>, 1 page.

Glover et al. "ARMA 16-0737: The Use of Measurements Made on Drill Cuttings to Construct and Apply Geomechanical Well Profiles," ARMA, presentation at the 50th US Rock Mechanics/ Geomechanics Symposium, Jun. 26-29, 2016, 11 pages.

Golomb et al, "Macroemulsion of liquid and supercritical CO2-in-water and water-in-liquid CO2 stabilized with fine particles," Ind. Eng. Chem. Res. 2006, 45(8), pp. 2728-2733, 6 pages.

Goodman, "Introduction to Rock Mechanics," John Wiley & Sons, Chapter 3: Rock Strength and Failure Criteria; 21 pages.

Han et al., "LBM-DEM Modeling of Fluid-Solid Interaction in Porous Media," Int. J. Numer. Anal. Meth. Geomech., published in 2013, 17 pages.

Han et al., "Numerical Modeling of Elastic Hemispherical Contact for Mohr-Coulomb Type Failures in Micro-Geomaterials," Experimental Mechanics, vol. 57, Jun. 16, 2017, 15 pages.

Han et al., "Application of Silver-Coated Magnetic Microspheres to a SERS-Based Optofluidic Sensor," The Journal of Physical Chemistry (JPCC), Mar. 7, 2011, 7 pages.

Harrison et al, "Water-in-Carbon Dioxide Microemulsions with a Fluorocarbon-Hydrocarbon Hybrid Surfactant," Langmuir 1994, 10(10), pp. 3536-3541. 6 pages.

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, vol. 112, Aug. 30, 2012; 16 pages.

Hornby et al., "Anisotropic Effective-Medium Modeling of the Elastic Properties of Shales," Geophysics, vol. 59, No. 10, Oct. 1994, 14 pages.

Hosemann et al, "Mechanical Characteristics of SiC Coating Layer in TRISO Fuel Particles," Journal of Nuclear Materials, vol. 442, published in 2013, 10 pages.

Hosemann et al., "An Exploratory Study to Determine Applicability of Nano-Hardness and Micro-compression Measurments for Yield Stress Estimation," Science Direct, published in 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 27, 2014, 10 pages.

Hull and Abousleiman, "New Frontiers in Oil and Gas Exploration," Chapter 10: Insights of the Rev of Source Shale from Nano- and Micromechanics, Springer International Publishing Switzerland, 2016, 29 pages.

Hull et al, "Nanomechanical Characterization of the Tensile Modulus of Rupture of Kerogen-Rich Shale," SPE Journal 2017, 22 (4), pp. 1024-1033, 10 pages.

Hull et al., "Recent Advances in Viscoelastic Surfactants for improved Production from Hydrocarbon Reservoirs," SPE Journal, 2016.

Huseby et al., "SPE-169183-MS: High Quality Flow Information from Tracer Data," Society of Petroleum Engineers (SPE), presented at the SPE Bergen One Day Seminar, Apr. 2, 2014, 9 pages.

(56) References Cited

OTHER PUBLICATIONS

Hutchins et al., "SPE-21049: Aqueous Tracers for Oilfield Applications," Society of Petroleum Engineers (SPE), presented at SPE International Symposium on Oilfield Chemistry, Feb. 20-22, 1991, 9 pages.

Iqbal et al., "In situ micro-cantilver tests to study fracture properties of NiAl single crystals," Acta Materialia, vol. 60, No. 3, Feb. 2012; 8 pages.

Itasca "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

Iyengar et al., "Analysis of Crack Propagation in Strain-Softening Beams," Engineering Fracture Mechanics, published in 2002, 18 pages.

Jia et al., "Highly Efficient Extraction of Sulfate Ions with a Tripodal Hexaurea Receptor," Angew. Chem. Int. Ed., published in 2011, vol. 50, pp. 486-490.

Jianhong et al., "Estimation of the Tensile Elastic Modulus using Brazilian disc by Applying Diametrically Opposed Concentrated Loads," International Journal of Rock Mechanics & Mining Sciences, vol. 46, No. 3, published in 2009, 568-576.

Johnston et al. "Water-in-Carbon Dioxide Microemulsions: An Environment for Hydrophiles Including Proteins," Science, vol. 271, issue 5249, pp. 624-626, Feb. 2, 1996, 3 pages.

Jose et al., "Continuous multi cycle nanoindentation studies on compositionally graded $Ti_{1-x}Al_xN$ multilayer thin films," (XP028230250) Materials Science and Engineering: A, Elsevier, vol. 528, No. 21, Apr. 20, 2011; 7 pages.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, published in 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences vol. 76, 2015.

King, "Thirty Years of Gas Shale Fracturing: What Have We Learned?" SPE-133456, presented at the SPE Annual Technical Conference and Exhibition, Sep. 19-22, 2010, 50 pages.

Klapetek, "Chapter 11: Thermal Measurements," Quantitative Data Processing in Scanning Probe Microscopy: SPE Applications for Nanometrology, 2018, 26 pages.

Kneipp et al., "Single Molecule Detection Using Surface-Enhanced Raman Scattering (SERS)," Physical Review Letters, American Physical Society vol. 78, No. 9, Mar. 3, 1997, 4 pages.

Kolymbas, "Kinematics of Shear Bands," Acta Geotechnica, published in 2009, 4 pages.

Kumar et al., "SPE 159804: Nano to Macro Mechanical Characterization of Shale," SPE International, presented at the SPE Annual Technical Conference and Exhibition, Oct. 8-10, 2012, 23 pages.

Kuperkar et al., "Visoelastic micellar water/CTAB/NaNO3 Solutions: Reology, SANS and cyro-TEM Analysis," Journal of Colloid and Interface Science, vol. 323, 403-409, 2008, 7 pages.

Lam et al., "Experiments and Theory in Strain Gradient Elasticity," J. Mech. And Phys. Of Solids, published in 2003, 32 pages.

Larsen et al., "Changes in the Cross-Link Density of Paris Basin Toarcian Kerogen During Maturation," Organic Geochemistry, published in 2002, 10 pages.

Laurent Brochard et al.; "Fracture Properties of Kerogen and Importance for Organic-Rich Shales"; Annual World Conference on Carbon (Carbon 2013), Jul. 2013, Rio de Janeiro, Brazil. HAL ID: hal-01274161, 6 pages.

Lee et al, "water-in carbon dioxide emulsions: Formation and stability" Langmuir, 1999, 15(20), pp. 6781-6791, 11 pages.

Li et al., "Mechanical Characterization of Micro/Nanoscale Structures for MEMS/NEMS Applications using Nanoindentation Techniques," Science Direct, published in 2003, 775 pages.

Li et al., "The Brazilian Disc Test for Rock Mechanics Applications: Review and New Insights," Rock Mech Rock Eng, published in 2013, 46: pp. 269-287.

Liu et al., "Applications of nano-indentation methods to estimate nanoscale mechanical properties of shale reservoir rocks," Journal of Natural Gas Science and Engineering, Elsevier, Amsterdam, NL, vol. 35, Sep. 29, 2016, 10 pages.

Liu et al., "Microstructural and geomechanical analysis of Bakken shale at nanoscale," Journal of Petroleum Science and Engineering, vol. 153, Mar. 23, 2017, 12 pages.

Liu, "Dimension effect on mechanical behavior of silicon micro—cantilver beams," Measurement, vol. 41, No. 8, Oct. 2008; 11 pages.

Liu, "Elastic Constants Determination and Deformation Observation Using Brazilian Disk Geometry," Experimental Mechanics, published in 2010, 50: pp. 1025-1039.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro—cantilver Testing to Evaluate—the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia; 7 pages.

Luan et al., "Creation of synthetic samples for phsyical modelling of natural shale," Geophysical Prospecting vol. 64, Jul. 2016, 17 pages.

Mahabadi et al., "A novel approach for micro-scale characterization and modeling of geomaterials incorporating actual material heterogeneity," (XP002689941) Geophysical Research Letters, American Geophysical Union, vol. 39, No. 1, L01303, Jan. 1, 2012: 6 pages.

Mahmoud et al., "Removal of Pyrite and Different Types of Iron Sulfide Scales in Oil and Gas Wells without H2S Generation," (IPTC-18279-MS) Presented at the International Petroleum Technology Conference (IPTC), Doha, Qatar, Dec. 6-9, 2015; 8 pages.

Maio et al., "Measuring Fracture Toughness of Coatings using Focused-ion-beam-machined Microbeams," published in 2004, 4 pages.

Marchetti et al., "Fluorous affinity chromatography for enrichment and determination of perfluoroalkyl substances," Annual Review of Analytical Chemistry vol. 84, Jul. 19, 2012, 8 pages.

Maxwell, "Microseismic hydraulic fracture imaging: The path toward optimizing shale gas production," The Leading Edge, Mar. 2011, 6 pages.

Mesa, "Spherical and rounded cone nano indenters," Micro Star Technologies Inc., available on or before Jan. 23, 2018, 24 pages.

Middleton et al, "Shale gas and non-aqueous fracturing fluids: Opportunities and challenges for supercritical CO 2," Applied Energy, 147, pp. 500-509, 2015, 10 pages.

Montgomery, "Chapter 2: Fracturing Fluid Components," Intech open science | open minds, Montgomery, 2013, 21 pages.

Moyer, "A Case for Molecular Recognition in Nuclear Separations: Sulfate Separation from Nuclear Wastes," Inorganic Chemisty, copyright 2012, pp. 3473-3490.

Moyner et al., "The Application of Flow Diagnostics for Reservoir Management," Society of Petroleum Engineers (SPE), Apr. 2015, 18 pages.

Oliver and Pharr, "An improved technique for determining hardness and elastic modulus using load and displacement sensing indentation experiments," Journal of Materials Research, vol. 7, No. 6, Jun. 1992, 20 pages.

Oliver and Pharr, "Measurement of hardness and elastic modulus by instrumented indentation: Advances in understanding and refinements to methodology," Journal of Materials Research, vol. 19, No. 1, Jan. 2004, 18 pages.

Ortega et al., "The Effect of Particle Shape and Grain-Scale Properties of Shale: A Micromechanics Approach," Int. J. Numer. Anal. Methd. Geomech., published in 2010, 33 pages.

(56) References Cited

OTHER PUBLICATIONS

Ortega et al., "The Effect of the Nanogranular Nature of Shale on their Poroelastic Behavior," Acta Geotechnica, published in 2007, 28 pages.
Ortega et al., "The Nanogranular Acoustic Signature of Shale," Geophysics, vol. 74, No. 3, May-Jun. 2009, 20 pages.
Pant, "Nanoindentation characterization of clay minerals and clay-based hybrid bio-geomaterials," disseration for degree of Doctor of Philosophy in the Department of Civil and Environmental Engineering at the Louisiana State University and Agricultural and Medical College, Dec. 2013, 111 pages.
Passey et al., "From Oil-Prone Source Rock to Gas-Producing Shale Reservoir—Geologic and Petrophysical Characterization of Unconventional Shale-Gas Reservoirs," Society of Petroleum Engineers International, CPS/SPE International Oil & Gas Conference and Exhibition, Beijing, China, Jun. 8-10, 2010, 29 pages.
Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.
Podio et al., "Dynamic Properties of Dry and Water-Saturated Green River Shale under Stress," Jun. 11, 1968, SPE 1825, 16 pages.
Pollard, D. D.and Fletcher, R.C., "Fundamentals of Structural Geology," Cambridge University Press, Sep. 1, 2005; p. 291.
Pollock and Hammiche, "Micro-thermal analysis: techniques and applications," Journal of Physics D: Applied Physics, vol. 34.9, 2001, 31 pages.
Poon et al., "An Analysis of Nanoindentation in Linearly Elastic Solids," International Journal of Solids and Structures, vol. 45, No. 24, Dec. 1, 2008; 16 pages.
Qin et al, "Applicability of nonionic surfactant alkyl poly glucoside in preparation of liquid CO2 emulsion," Journal of CO2 Utilization, 2018, 26, pp. 503-510, 8 pages.
Rajbanshi et al., "Sulfate Separation from Aqueous Alkaline Solutions by Selective Crystallization of Alkali Metal Coordination Capsules," Cryst. Growth Des., published in 2011, pp. 2702-2706.
Richard et al, "Slow Relaxation and Compaction of Granular Systems," Nature Materials, vol. 4, Feb. 7, 2005, 8 pages.
Rodriguez et al., "Imagining techniques for analyzing shale pores and minerals," National Energy Technology Laboratory, Dec. 2, 2014, 44 pages.
Rostami et al., "DABCO tribromide immobilized on magnetic nanoparticie as a recyclable catalyst for the chemoselective oxidation of sulfide using H2O2 under metaland solvent-free condition," Catal. Commun. 2014, 43, 16-20, 20 pages.
Rowan et al., "Dynamic Covalent Chemistry," Angewante Chemie International Edition, Mar. 15, 2002, 55 pages.
Ryoo et al, "Water-in-Carbon Dioxide Microemulsions with Methylated Branched Hydrocarbon Surfactants," Industrial & Engineering Chemistry Research 2003 42 (25), pp. 6348-6358, 11 pages.
Sagisaka et al. "A New Class of Amphiphiles Designed for Use in Water-in-Supercritical CO2 Microemulsions," Langmuir 2016 32 (47), pp. 12413-12422, 44 pages.
Sagisaka et al, "Effect of Fluorocarbon and Hydrocarbon Chain Lengths In Hybrid Surfactants for Supercritical CO2," Langmuir 2015 31 (27), pp. 7479-7487, 36 pages.
Sagisaka et al, "Nanostructures in Water-in-CO2 Microemulsions Stabilized by Double-Chain Fluorocarbon Solubilizers," Langmuir 2013 29 (25), pp. 7618-7628, 11 pages.
Sayed and Al-Muntasheri, "A Safer Generation of Wettability Alteration Chemical Treatments," SPE-184566-MS, presented at the SPE International Conference on Oilfield Chemistry, Apr. 3-5, 2017, 25 pages.
Selvin et al., "Principles and biophysical applications of lanthanide-based probes," Annual Review of Biophysics and Biomolecular Structure, Jun. 2002, 28 pages.
Serres-Piole et al., "Water tracers in oilfield applications: Guidelines," Elsevier Ltd., Journal of Science and Engineering, Nov. 2012, 18 pages.
Shahid et al., "Natural-fracture reactivation in shale gas reservoir and resulting microseismicity," Journal of Canadian Petroleum Technology vol. 54.06, 2015.
Shin et al., "Development and Testing of Microcompression for Post Irradiation Characterization of ODS Steels," J. Nuclear Materials, published in 2014, 6 pages.
Shook et al., "SPE 124614: Determining Reservoir Properties and Flood Performance from Tracer Test Analysis," Society of petroleum Engineers (SPE), presented at SPE Annual Technical Conference and Exhibition, Oct. 4-7, 2009, 19 pages.
Shukla et al., "ARMA 13-578: Nanoindentation Studies on Shales," ARMA, presented at the 47th US Rock Mechanics/Geomechanics Symposium, Jun. 23-26, 2013, 10 pages.
Sierra et al., "Woodford Shale Mechanical Properties and the Impacts of Lithofacies," ARMA 10-461, copyright 2010, 10 pages.
Singh et al., "Facies classification based on seismic waveform," presented at the 5th Conference & Exposition on Petroleum Geophysics, Jan. 15-17, 2004, 7 pages.
Siskin et al., "Reactivity of organic compounds in hot water: geochemical and technological implications," Science, Oct. 11, 1991, 8 pages.
Slatt et al., "Merging Sequence Stratigraphy and Geomechanics for Unconventional Gas Shales," The Leading Edge, Mar. 2011, 8 pages.
Slatt et al., "Outcrop/Behind Outcrop (Quarry), Multiscale Characterization of the Woodford Gas Shale," copyright 2011, 22 pages.
Sone et al., "Mechanical Properties of Shale-Gas Reservoir Rocks—Part 1: Static and Dynamic Elastic Properties and Anisotropy," Geophysics, vol. 78, No. 5, Sep.-Oct. 2013, 12 pages.
Sone et al., "Mechanical properties of shale-gas reservoir rocks—Part 2: Ductile creep, brittle strength, and their relation to the elastic modulus," 2013, Geophysics, vol. 78, No. 5, 10 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.
Stiles et al., "Surface-enhanced Raman Spectroscopty," Annual Review of Analytical Chemistry, Mar. 18, 2008, 29 pages.
Tabatabaei et al., "Well performance diagnosis with temperature profile measurements," in SPE Annual Technical Conference and Exhibition, Society of Petroleum Engineers, Oct. 30-Nov. 2, 2011, published Jan. 2011, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Ulm et al., "Material Invariant Poromechanics Properties of Shales," published in 2005, 8 pages.
Ulm et al., "The Nanogranular Nature of Shale," Acta Geotechnica, published in 2006, 12 pages.
Vanlandingham, "Review of Instrumented Indentation," Journal of Research of the National Institute of Standards and Technology, vol. 108, No. 4, Jul.-Aug. 2003; 17 pages.
Vernik et al., "Ultrasonic Velocity and Anisotropy of Hydrocarbon Source Rocks," Geophysics, vol. 57, No. 5, May 1992, 9 pages.
Walters et al., "Inetic rheology of hydraulic fracturing fluids," SPE Annual Technical Conference and Exhibition, Society of Petroleum Engineers, 2001.
Wang and Shen, "A Feasibility Analysis on Shale Gas Exploitation with Supercritical Carbon Dioxide," Energy Sources, Part A: Recovery, Utilization and Environmental Effects, 34(15), pp. 1426-1435, 2012, 11 pages.
Wang et al., "A Numerical Study of Factors Affecting the Characterization of Nanoindent ation on Silicon," Materials Science and Engineering: A, vol. 447, No. 1, Feb. 25, 2007; 10 pages.
Wang et al., "Iron Sulfide Scale Dissolvers: How Effective Are They?" Presented at the SPE Saudi Arabia section Annual Technical Symposium and Exhibition (SPE-168063-MS), Khobar, Saudi Arabia, May 19-22, 2013; 22 pages.
Warpinski, "Understanding Hydraulic Fracture Growth, Effectiveness, and Safety Through Microseismic Monitoring," Intech, May 17, 2013, 14 pages.
Wegst et al., "Bioinspired structural materials," Nature Materials, vol. 14, Jan. 2015, 14 pages.

(56) References Cited

OTHER PUBLICATIONS

Wenk et al., "Preferred Orientation and Elastic Anisotropy of Illite-Rich Shale," Geophysics, vol. 72, No. 2, Mar.-Apr. 2007, 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.
Wilson et al., "Fracture testing of bulk silicon microcantilever beams subjected to a side load," Journal of Microelectromechanical Systems, vol. 5, No. 3, Sep. 1996; 9 pages.
Wu et al., "A reusable biosensor chip for SERS-fluorescence dual mode immunoassay," Proc. SPIE 9543, Third International Symposium on Laser Interaction with Matter, 954317, May 4, 2015, 6 pages.
Wu et al., "A SERS-Assisted 3D Barcode Chip for High-Throughput Biosensing," Small Journal vol. 11, No. 23, Jun. 11, 2015, 9 pages.
Wurster et al., "Characterization of the fracture toughness of microsized tungsten single crystal notched specimens," Philosophical Magazine, vol. 92, No. 14, May 2012; 23 pages.
Wurzenberger et al., "Nitrogen-Rich Copper(II) Bromate Complexes: an Exotic Class of Primary Explosives," Journal of Inorganic Chemistry, vol. 57, 2018, 10 pages.
Xu et al.., "Measurement of two-photon excitation cross sections of molecular fluorophores with data from 690 to 1050 nm," Journal of the Optical Society of America B, Mar. 1996, 11 pages.
Yang et al., "Nanoscale geochemical and geomechanical characterization of organic matter in shale," Nature Communications, vol. 8, 2179, Dec. 19, 2017, 9 pages.
Zamberi et al., "SPE 166005: Improved Reservoir Surveillance Through Injected Tracers In A Saudi Arabian Field: Case Study," Society of Petroleum Engineers (SPE), presented at SPE Reservoir Characterization and Simulation Conference and Exhibition, Sep. 16-18, 2013, 15 pages.
Zemel, "Chapter 3: Interwell Water Tracers," Tracers in the Oil Field, vol. 43, 1st Edition, Elsevier Science, Jan. 13, 1995, 47 pages.
Zeszotarski et al., "Imaging and Mechanical Property Measurements of Kerogen via Nanoindentation," Geochimica et Cosmochimica Acta, vol. 68. No. 20, Oct. 15, 2004, 7 pages.
Zhou et al., "Upconversion luminescent materials: advances and applications," Chem Rev., Jan. 14, 2015, 71 pages.
Zielinski et al, "A Small-Angle Neutron Scattering Study of Water in Carbon Dioxide Microemulsions," Langmuir 1997, 13(15), pp. 3934-3937, 4 pages.
PCT International Search Report and Written Opinion in International Appln. No. PCT/US2020/043401, dated Dec. 14, 2020, 17 pages.
PCT Invitation to Pay Additional Fees in International Appln. No. PCT/US2020/043401, dated Oct. 23, 2020, 12 pages.
"Hydraulic Fracturing Fluid Product Component Information Disclosure," Progress Energy Canada Ltd., Jan. 2012, 2 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, Feb. 2004, 41(2): 245-253, 9 pages.
GCC Examination Report in Gulf Cooperation Council Appln. No. GC 2020-40151, dated Sep. 6, 2021, 5 pages.

* cited by examiner

ORGANIC SALTS OF OXIDIZING ANIONS AS ENERGETIC MATERIALS

CROSS-REFERENCE TO RELATED APPLICATIONS

This application claims priority to U.S. Provisional Application Ser. No. 62/878,060, filed on Jul. 24, 2019, which is incorporated by reference in its entirety.

TECHNICAL FIELD

This disclosure describes energetic salts and methods for using such salts in applications involving subterranean formations.

BACKGROUND

Energetic materials, materials that contain a large amount of stored chemical potential energy, are used in a variety of applications including mining, demolition, rocket propulsion, and pulse fracturing for hydrocarbon recovery. Common classes of energetic materials include explosives, solid propellants (such as gunpowder and rocket fuel), fuels, and pyrotechnics.

Salts of oxidizing anions with organic cations can be used as propellants and explosives. Ammonium salts of oxidizing anions are known to be thermally unstable. For example, ammonium bromate detonates above 60° C., and ammonium nitrate is a well-known explosive. Primary, secondary, and ternary ammonium salts of nitrate have been identified as potential fuels (see, for example, U.S. Pat. No. 6,652,682), while alkylammonium salts with one to three carbons may be used as fuels (see U.S. Pat. No. 6,165,295). Mixtures of primary, secondary, and tertiary amines with perchloric acid or nitric acid as a liquid monopropellant have been used in aqueous-based systems (U.S. Pat. No. 4,047,988). Wurzenberger et al. have recognized the potential to use bromate in compounds containing organics and metal (J. Inorg. Chem., 2018, 57(13):7940-7949). Such compounds have also been used in electrochemical applications (U.S. Pat. No. 4,864,472; WO 2015/126082).

However, sensitivity to shock, pressure, temperature, density, and chemical sensitivity limits the ability to use various energetic materials safely and effectively, such as downhole in subterranean extraction operations. Typically, salts of oxidizing anions and organic cations are highly unstable and control of the detonation process is difficult. Known salts also often require metals for stabilization. Therefore, there is a need for energetic salts of organic cations and oxidizing anions, particularly metal-free salts, that can be used as propellants or explosives that are stable and have a controlled molecular basis for reaction.

SUMMARY

The present disclosure describes energetic salts, compositions containing the energetic salts, and methods of treating subterranean formations using the energetic salts and compositions described in the present disclosure.

Thus, provided in the present disclosure are energetic salts that contain an organic cation and an oxidizing anion, where the energetic salt is capable of detonation upon reaction of the cation with the anion. In some embodiments, the energetic salt is metal-free. In some embodiments, the energetic salt is dry or neat.

In some embodiments, the reaction of the cation with the anion is triggered by pressure or heat. In some embodiments, the reaction is triggered by crushing the energetic salt. In some embodiments, the reaction is triggered by heating the energetic salt to a temperature of about 90° C. or higher or about 100° C. or higher. In some embodiments, the reaction of the cation with the anion produces volatile gaseous products.

In some embodiments, the organic cation is selected from the group consisting of quaternary ammonium salts ($NR^+_4$), ternary ammonium salts ($NHR_3^+$), secondary ammonium salts ($NH_2R_2^+$), primary ammonium salts ($NH_3R^+$), quaternary phosphonium salts ($PR_4^+$), ternary phosphonium salts ($PHR_3^+$), secondary phosphonium salts ($PH_2R_2^+$), primary phosphonium salts ($PH_3R^+$), sulfonium salts ($SR_3^+$), bis(triphenylphosphine)iminium (PPN) salts, imidazolium salts, pyridinium salts, and pyrrolidinium salts, and derivatives thereof; where each R group is independently selected from a $C_1$-$C_8$ alkyl group, a 4 to 8-membered aryl, a 4 to 8-membered heteroaryl having 1 to 5 heteroatoms selected from N, O, and S, or a 4 to 8-membered heterocycle having 1 to 5 heteroatoms selected from N, O, and S. In some embodiments, the organic cation is selected from the group consisting of quaternary ammonium salts ($NR_4^+$), ternary ammonium salts ($NHR_3^+$), secondary ammonium salts ($NH_2R_2^+$), primary ammonium salts ($NH_3R^+$), bis(triphenylphosphine)iminium (PPN) salts, and pyridinium salts, and derivatives thereof. In some embodiments, the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

In some embodiments, the oxidizing anion is selected from the group consisting of chlorate ($ClO_3^-$), bromate ($BrO_3^-$), chlorite ($ClO_2^-$), hypochlorite ($ClO^-$), perchlorate ($ClO_4^-$), iodate ($IO_3^-$), bromite ($BrO_2^-$), hypobromite ($BrO^-$), nitrite ($NO_2^-$), perbromate ($BrO_4^-$), periodate ($IO_4^-$), iodite ($IO_2^-$), and hypoiodite ($IO^-$). In some embodiments, the oxidizing anion is selected from the group consisting of chlorate ($ClO_3^-$) and bromate ($BrO_3^-$).

In some embodiments, the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt and the oxidizing anion is selected from the group consisting of chlorate ($ClO_3^-$) and bromate ($BrO_3^-$).

In some embodiments, the energetic salt is selected from the group consisting of tetrabutylammonium bromate ([$Bu_4N$]$BrO_3$), tributylammonium bromate ([$Bu_3NH$]$BrO_3$), dibutylammonium bromate ([$Bu_2NH_2$]$BrO_3$), butylammonium bromate ([$BuNH_3$]$BrO_3$), tetrabutylammonium chlorate ([$Bu_4N$]$ClO_3$), bis(triphenylphosphine)iminium bromate ([PPN]$BrO_3$), bis(triphenylphosphine)iminium chlorate ([PPN]$ClO_3$), and pyridinium bromate ([PyrH]$BrO_3$).

Also provided in the present disclosure are compositions containing a fluid and an energetic salt that contains an organic cation and an oxidizing anion, where the energetic salt is capable of detonation upon reaction of the cation with the anion. In some embodiments, the composition is metal-free.

In some embodiments of the composition, the fluid is selected from among an aqueous fluid, supercritical carbon dioxide ($CO_2$), a foam, and an emulsion. In some embodiments, the fluid is a foam or an emulsion having an aqueous continuous phase and a discontinuous phase containing nitrogen ($N_2$), $CO_2$, or natural gas. In some embodiments, the fluid is a foam or an emulsion having an aqueous dispersed phase and a continuous phase containing $N_2$, $CO_2$, or natural gas.

In some embodiments of the composition, the reaction of the cation with the anion is triggered by pressure or heat. In some embodiments, the reaction is triggered by crushing the energetic salt. In some embodiments, the reaction is triggered by heating the energetic salt to a temperature of about 90° C. or higher or about 100° C. or higher. In some embodiments, the reaction of the cation with the anion produces volatile gaseous products.

In some embodiments of the composition, the organic cation is selected from the group consisting of quaternary ammonium salts ($NR^+_4$), ternary ammonium salts ($NHR_3^+$), secondary ammonium salts ($NH_2R_2^+$), primary ammonium salts ($NH_3R^+$), quaternary phosphonium salts (PRO, ternary phosphonium salts ($PHR_3^+$), secondary phosphonium salts ($PH_2R^+$), primary phosphonium salts ($PH_3R^+$), sulfonium salts ($SR_3^+$), bis(triphenylphosphine)iminium (PPN) salts, imidazolium salts, pyridinium salts, and pyrrolidinium salts, and derivatives thereof; where each R group is independently selected from a $C_1$-$C_8$ alkyl group, a 4 to 8-membered aryl, a 4 to 8-membered heteroaryl having 1 to 5 heteroatoms selected from N, O, and S, or a 4 to 8-membered heterocycle having 1 to 5 heteroatoms selected from N, O, and S. In some embodiments, the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

In some embodiments of the composition, the oxidizing anion is selected from the group consisting of chlorate ($ClO_3^-$), bromate ($BrO_3^-$), chlorite ($ClO_2^-$), hypochlorite ($ClO^-$), perchlorate ($ClO_4^-$), iodate ($IO_2^-$), bromite ($BrO_{02}^-$), hypobromite ($BrO^-$), nitrite ($NO_2^-$), perbromate ($BrO_4^-$), periodate ($IO_4^-$), iodite ($IO_2^-$), and hypoiodite ($IO^-$). In some embodiments, the oxidizing anion is selected from the group consisting of chlorate ($ClO_3^-$) and bromate ($BrO_3^-$).

In some embodiments of the composition, the energetic salt is selected from the group consisting of tetrabutylammonium bromate ($[Bu_4N]BrO_3$), tributylammonium bromate ($[Bu_3NH]BrO_3$), dibutylammonium bromate ($[Bu_2NH_2]BrO_3$), butylammonium bromate ($[BuNH_3]BrO_3$), tetrabutylammonium chlorate ($[Bu_4N]ClO_3$), bis(triphenylphosphine)iminium bromate ($[PPN]BrO_3$), bis(triphenylphosphine)iminium chlorate ($[PPN]ClO_3$), and pyridinium bromate ($[PyrH]BrO_3$).

In some embodiments of the composition, the energetic salt is encapsulated, dissolved in the fluid, or dispersed as a slurry. In some embodiments, the energetic salt is encapsulated with a polymeric enteric coating selected from the group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

In some embodiments, the composition contains about 0.1 pounds per gallon (ppg) to about 10 ppg or about 0.1 ppg to about 5 ppg of the energetic salt.

In some embodiments, the composition contains one or more additives. In some embodiments, the one or more additives are selected from the group consisting of a polymer, a surfactant, a crosslinking agent, a breaker, a clay inhibitor, a corrosion inhibitor, a scale inhibitor, a flowback aid, and a biocide, and combinations thereof.

Also provided in the present disclosure are methods of treating a subterranean formation, the method including the steps of providing a composition containing an energetic salt including an organic cation and an oxidizing anion to a subterranean formation; and triggering a reaction between the cation and the anion, where the energetic salt detonates. In some embodiments of the method, the composition is metal-free.

In some embodiments of the method, the reaction of the cation with the anion is triggered by pressure or heat. In some embodiments, the reaction is triggered by crushing the energetic salt. In some embodiments, the reaction is triggered by heating the energetic salt to a temperature of about 90° C. or higher or about 100° C. or higher. In some embodiments, the reaction of the cation with the anion produces volatile gaseous products.

In some embodiments of the method, the organic cation is selected from the group consisting of quaternary ammonium salts ($NR^+_4$), ternary ammonium salts ($NHR_3^+$), secondary ammonium salts ($NH_2R_2^+$), primary ammonium salts ($NH_3R^+$), quaternary phosphonium salts ($PR_4^+$), ternary phosphonium salts ($PHR_3^+$), secondary phosphonium salts ($PH_2R_2^+$), primary phosphonium salts ($PH_3R^+$), sulfonium salts ($SR_3^+$), bis(triphenylphosphine)iminium (PPN) salts, imidazolium salts, pyridinium salts, and pyrrolidinium salts, and derivatives thereof where each R group is independently selected from a $C_1$-$C_8$ alkyl group, a 4 to 8-membered aryl, a 4 to 8-membered heteroaryl having 1 to 5 heteroatoms selected from N, O, and S, or a 4 to 8-membered heterocycle having 1 to 5 heteroatoms selected from N, O, and S. In some embodiments, the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

In some embodiments of the method, the oxidizing anion is selected from the group consisting of chlorate ($ClO_3^-$), bromate ($BrO_3^-$), chlorite ($ClO_2^-$), hypochlorite ($ClO^-$), perchlorate ($ClO_4^-$), iodate ($IO_3^-$), bromite ($BrO_2^-$), hypobromite ($BrO^-$), nitrite ($NO_2^-$), perbromate ($BrO_4^-$), periodate ($IO_4^-$), iodite ($IO_2^-$), and hypoiodite ($IO^-$). In some embodiments, the oxidizing anion is selected from the group consisting of chlorate ($ClO_3^-$) and bromate ($BrO_3^-$).

In some embodiments of the method, the energetic salt is selected from the group consisting of tetrabutylammonium bromate ($[Bu_4N]BrO_3$), tributylammonium bromate ($[Bu_3NH]BrO_3$), dibutylammonium bromate ($[Bu_2NH_2]BrO_3$), butylammonium bromate ($[BuNH_3]BrO_3$), tetrabutylammonium chlorate ($[Bu_4N]ClO_3$), bis(triphenylphosphine)iminium bromate ($[PPN]BrO_3$), bis(triphenylphosphine)iminium chlorate ($[PPN]ClO_3$), and pyridinium bromate ($[PyrH]BrO_3$).

In some embodiments of the method, the composition contains a fluid selected from among an aqueous fluid, supercritical $CO_2$, a foam, and an emulsion.

In some embodiments of the method, the energetic salt is encapsulated, dissolved in the fluid, or dispersed as a slurry. In some embodiments, the energetic salt is encapsulated with a polymeric enteric coating selected from the group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

In some embodiments of the method, the composition contains about 0.1 ppg to about 10 ppg or about 0.1 ppg to about 5 ppg of the energetic salt.

In some embodiments of the method, the composition contains one or more additives. In some embodiments, the one or more additives are selected from the group consisting of a polymer, a surfactant, a crosslinking agent, a breaker, a clay inhibitor, a corrosion inhibitor, a scale inhibitor, a flowback aid, and a biocide, and combinations thereof.

In some embodiments, the method is for hydraulic fracturing, pressure pulse fracturing, formation damage removal, or lowering the viscosity of heavy oil.

In some embodiments of the method, detonation of the energetic salt creates fractures in the subterranean formation, provides a pressure pulse to the subterranean formation, breaks up deposits in the well that are impeding the flow of oil and gas, lowers the viscosity and encourages the flow of heavy oil in the subterranean formation, and combinations thereof.

The details of one or more implementations of the subject matter of this disclosure are set forth in the Detailed Description, the accompanying drawings, and the claims. Other features, aspects, and advantages of the subject matter will become apparent from the Detailed Description, the claims, and the accompanying drawings.

DETAILED DESCRIPTION

Figure 1:
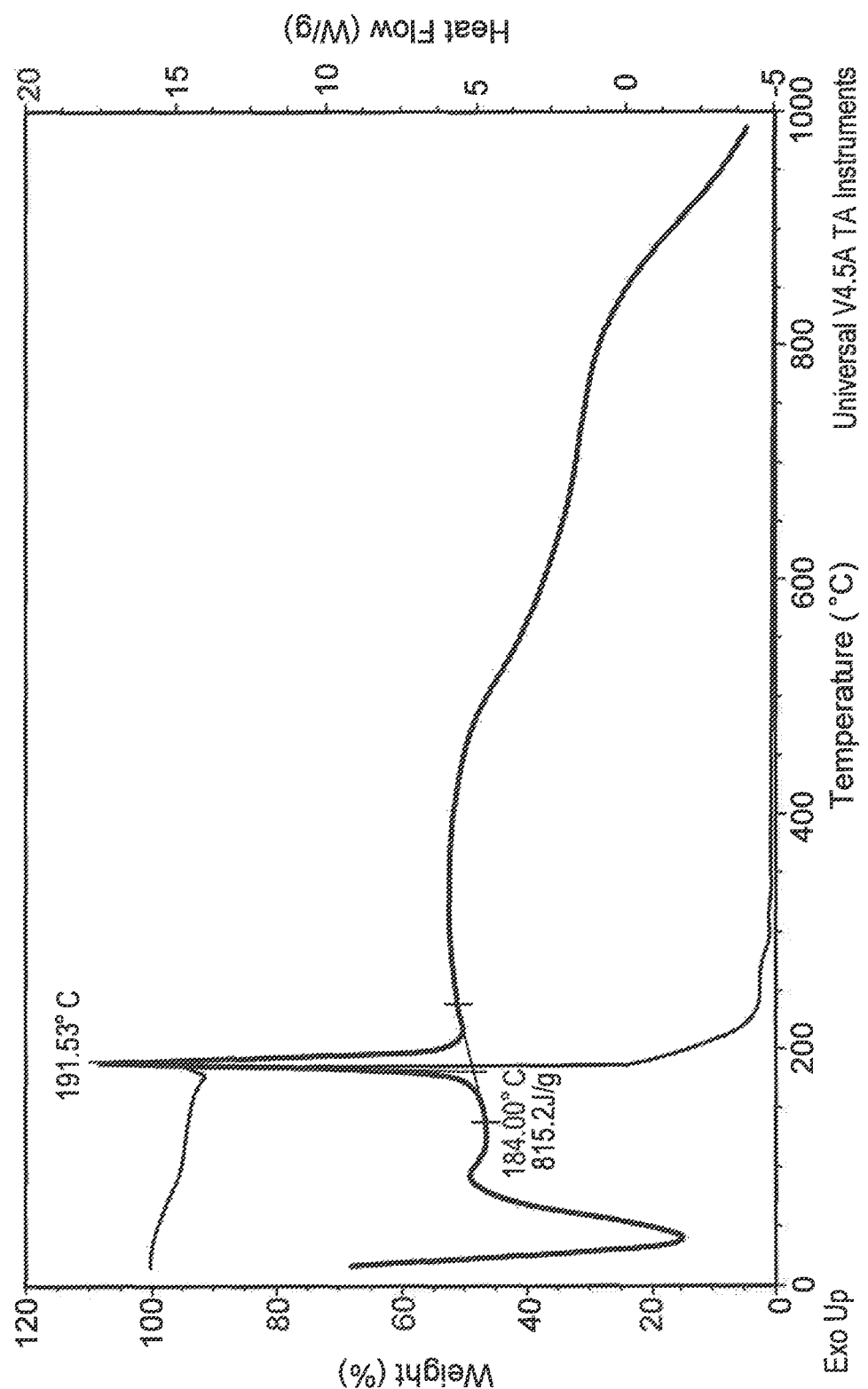
FIG. 1 shows the thermogravimetric analysis (TGA) decomposition profile of [Bu$_4$N]BrO$_3$ under argon.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present application provides salts of oxidizing anions and organic cations that can be used as propellants, explosives, or both. Typically, solid propellants rely on the oxidation of a reducing agent (for example, carbon, sulfur, metal powders, or phosphorus) by an oxidizing agent (such as alkali or alkali earth salts of nitrate, nitrite, bromate, or chlorate). In these cases, the propellant is a solid composite of the reducing agent and oxidizing agent. Central to the function of a solid propellant is the ability of the oxidizer and reducing agent to be in close enough proximity for the reaction to proceed. Smaller particle sizes of each component will leader to faster reaction rates and a more homogenous reaction.

The compounds of the present application are salts made up of an organic cation or cations and inorganic oxidizing anion(s) in a pure or neat form, be it solid or liquid. In the salts of the present disclosure, the organic cation, which can be viewed as a reducing agent, is electrostatically bound to the oxidizing anion in a salt lattice or ionic liquid. In other words, the formulation places the fuel and oxidizer in the closest proximity possible. This gives rise to a controlled molecular basis for reaction rather than the bulk phenomena typically observed in existing propellant or gunpowder formulations. The oxidizing anions of the present disclosure are relatively stable with organic cations, until reaction between the cation and anion is triggered and the salts become unstable rapidly and exothermically to give gaseous products. In some embodiments, the reaction is triggered by pressure, temperature, or both. At a threshold temperature or pressure, the energetic salts of the present disclosure decompose rapidly and exothermically with gas evolution. In some embodiments, the reactions occur supersonically.

Depending on which cation/anion pair is used, a range of decomposition parameters can be achieved. Some cation/anion pairs will have more or less explosivity and will decompose at different rates. Thus, the energetic salts of the present disclosure can be useful in fields ranging from mining to rocket propulsion.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1 to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, "detonation" refers to initiation, ignition, and combustion of the energetic salt of the present disclosure.

"Metal-free," as used in the present disclosure, refers to a salt or composition of the present disclosure that is substantially free of any metal, for example, the salt or composition contains less than about 1%, less than about 0.5%, less than about 0.1%, or less than about 0.01% of metal.

The term "alkyl" as used in the present disclosure refers to straight chain and branched alkyl groups and cycloalkyl groups having from 1 to 8 carbon atoms. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used in the present disclosure, the term "alkyl" encompasses n-alkyl, isoalkyl, and anteisoalkyl groups as well as other branched chain forms of alkyl.

The term "aryl" as used in the present disclosure refers to a single all carbon aromatic ring or a multiple condensed all carbon ring system where at least one of the rings is aromatic. For example, in certain embodiments, an aryl group has 4 to 8 carbon atoms. Aryl includes a phenyl radical. In some embodiments, the aryl group is substituted with one or more substituents.

"Heteroaryl" refers to mono or multicyclic aryl group in which one or more of the aromatic carbon atoms (and any associated hydrogen atoms) are independently replaced with the same or different heteroatom or heteroatomic group, including N, O, or S. In some embodiments, the heteroaryl group is substituted with one or more substituents.

The term "heterocycle" as used in the present disclosure refers to a single saturated or partially unsaturated non-aromatic ring that has at least one heteroatom in the ring (at least one annular heteroatom selected from oxygen, nitrogen, and sulfur). Unless otherwise specified, a heterocyclyl group has from 5 to about 8 annular atoms. Thus, the term includes single saturated or partially unsaturated rings (for example, 3, 4, 5, 6 or 7-membered rings) having from about 1 to 6 annular carbon atoms and from about 1 to 3 annular heteroatoms selected from the group consisting of oxygen, nitrogen and sulfur in the ring. In some embodiments, the heterocyclic group is substituted with one or more substituents.

The term "substituted" as used in this disclosure refers to an organic group or molecule in which one or more hydrogen atoms contained in the molecule are replaced by one or more non-hydrogen atoms. The term "substituent" refers to a group that can be or is substituted onto a molecule or onto an organic group. Examples of substituents include, but are not limited to, a halogen (for example, F, Cl, Br, and I); an oxygen atom in groups such as hydroxy groups, alkoxy groups, aryloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

As used in this disclosure, the term "fluid" refers to liquids and gels, unless otherwise indicated.

As used in this disclosure, the term "fracturing fluid" refers to fluids or slurries used downhole during fracturing operations.

As used in this disclosure, the terms "subterranean formation" and "subterranean material" refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

As used in this document, "treating a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, and abandonment.

The term "downhole," as used in the present disclosure, refers to under the surface of the earth, such as a location within or fluidly connected to a wellbore.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert water, a downhole fluid, or a produced hydrocarbon from a wellbore, fracture, or flow pathway connected to the pathway.

Energetic Salts

Provided in this disclosure are metal-free energetic salts that contain one or more oxidizing anions and one or more organic cations. The energetic salts are either dry or neat. For example, the energetic salts are non-aqueous. The energetic salts of the present disclosure are capable of detonation upon reaction of the organic cation with the oxidizing anion. In some embodiments, the reaction of the cation with the anion is triggered by temperature. In some embodiments, the reaction of the cation with the anion is triggered by pressure, for example, by crushing the energetic salt. In some embodiments, detonation of the energetic salt produces volatile gaseous products. The energetic salts of the present disclosure are thermally stable and only detonate upon response to a triggering or initiating event, such as triggering by pressure or by temperature.

Oxidizing Anions

The oxidizing anions that can be included in the energetic salts of the present disclosure can be any oxidizing anion. In some embodiments, the oxidizing anion is metal-free. Examples of suitable oxidizing anions include, but are not limited to, chlorate ($ClO_3^-$), bromate ($BrO_3^-$), chlorite ($ClO_2^-$), hypochlorite ($ClO^-$), perchlorate ($ClO_4^-$), iodate ($IO_3^-$), bromite ($BrO_2^-$), hypobromite ($BrO^-$), nitrite ($NO_2^-$), perbromate ($BrO_4^-$), periodate ($IO_4^-$), iodite ($IO_2^-$), and hypoiodite ($IO^-$). In some embodiments, the oxidizing anion is selected from the group consisting of chlorate ($ClO_3^-$) and bromate ($BrO_3^-$). In some embodiments, the oxidizing anion is chlorate ($ClO_3^-$). In some embodiments, the oxidizing anion is bromate ($BrO_3^-$).

Organic Cations

The organic cations that can be included in the energetic salts of the present disclosure can be any organic cation. In some embodiments, the organic cation is a polycation. In some embodiments, the organic cation is a polymer. For example, the polymer can be a poly-quaternary ammonium chain. In some embodiments, the organic cation is metal-free. In some embodiments, the organic cation includes sulfur, phosphorus, oxygen, or nitrogen atoms.

Examples of suitable organic cations include, but are not limited to, quaternary ammonium salts ($NR^+_4$), ternary ammonium salts ($NHR_3^+$), secondary ammonium salts ($NH_2R_2^+$), primary ammonium salts ($NH_3R^+$), quaternary phosphonium salts ($PR_4^+$), ternary phosphonium salts ($PHR_3^+$), secondary phosphonium salts ($PH_2R_2^+$), primary phosphonium salts ($PH_3R^+$), sulfonium salts ($SR_3^+$), bis(triphenylphosphine)iminium (PPN) salts, imidazolium salts, pyridinium salts, and pyrrolidinium salts, and derivatives thereof; where each R group is independently selected from a $C_1$-$C_8$ alkyl group, a 4 to 8-membered aryl, a 4 to 8-membered heteroaryl having 1 to 5 heteroatoms selected from N, O, and S, or a 4 to 8-membered heterocycle having 1 to 5 heteroatoms selected from N, O, and S. In some embodiments, the organic cation is selected from the group consisting of quaternary ammonium salts ($NR_4^+$), ternary ammonium salts ($NHR_3^+$), secondary ammonium salts ($NH_2R_2^+$), primary ammonium salts ($NH_3R^+$), bis(triphenylphosphine)iminium (PPN) salts, and pyridinium salts, and derivatives thereof. In some embodiments, the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt. In some embodiments, the organic cations of the present disclosure are alkylammonium bromates or alkylammonium chlorates.

Exemplary Energetic Salts

The energetic salts of the present disclosure are metal-free and contain an organic cation and an oxidizing anion and are either dry or in neat form, for example, the salts are not aqueous. The energetic salts of the present disclosure are capable of detonation upon reaction of the cation with the anion.

In some embodiments, the energetic salt contains an organic cation, where the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt; and an oxidizing anion, where the oxidizing anion is selected from the group consisting of chlorate ($ClO_3^-$) and bromate ($BrO_3^-$).

In some embodiments, the energetic salt is selected from the group consisting of tetrabutylammonium bromate ($[Bu_4N]BrO_3$), tributylammonium bromate ($[Bu_3NH]BrO_3$), dibutylammonium bromate ($[Bu_2NH_2]BrO_3$), butylammonium bromate ($[BuNH_3]BrO_3$), tetrabutylammonium chlorate ($[Bu_4N]ClO_3$), bis(triphenylphosphine)iminium bromate ($[PPN]BrO_3$), bis(triphenylphosphine)iminium chlorate ($[PPN]ClO_3$), and pyridinium bromate ($[PyrH]BrO_3$). In some embodiments, the energetic salt is tetrabutylammonium bromate ($[Bu_4N]BrO_3$). In some embodiments, the energetic salt is tributylammonium bromate ($[Bu_3NH]BrO_3$). In some embodiments, the energetic salt is dibutylammonium bromate ($[Bu_2NH_2]BrO_3$). In some embodiments, the energetic salt is butylammonium bromate ($[BuNH_3]BrO_3$). In some embodiments, the energetic salt is tetrabutylammonium chlorate ($[Bu_4N]ClO_3$). In some embodiments, the energetic salt is bis(triphenylphosphine)iminium bromate ($[PPN]BrO_3$). In some embodiments, the energetic salt is bis(triphenylphosphine)iminium chlorate ($[PPN]ClO_3$). In some embodiments, the energetic salt is pyridinium bromate ($[PyrH]BrO_3$).

In some embodiments, the energetic salt is an alkylammonium bromate or an alkylammonium chlorate. In some embodiments, the alkylammonium bromate or alkylammonium chlorate is synthesized using a double-displacement reaction of $(R_4N)_2SO_4$ with $Ba(XO_3)_2$ to yield $(R_4N)_2XO_3$ and $BaSO_4$, where X is Br or Cl and each R group is independently selected from H, a $C_1$-$C_8$ alkyl group, a 4 to 8-membered aryl, a 4 to 8-membered heteroaryl having 1 to 5 heteroatoms selected from N, O, and S, and a 4 to 8-membered heterocycle having 1 to 5 heteroatoms selected from N, O, and S. In some embodiments, the alkylammonium compounds $[Bu_4N]BrO_3$, $[Bu_3NH]BrO_3$, $[Bu_2NH_2]BrO_3$, and $[BuNH_3]BrO_3$ were prepared by this method.

In some embodiments, the energetic salt is a sulfate salt prepared by the reaction of an amine ($R_3N$) with sulfuric acid, where each R group is independently selected from H, a $C_1$-$C_8$ alkyl group, a 4 to 8-membered aryl, a 4 to 8-membered heteroaryl having 1 to 5 heteroatoms selected from N, O, and S, and a 4 to 8-membered heterocycle having 1 to 5 heteroatoms selected from N, O, and S. In some embodiments, the sulfate salts of $[Bu_3NH]^+$, $[Bu_2NH_2]^+$, and $[BuNH_3]^+$ were prepared by this method.

Detonation of the Energetic Salt

The energetic salts of the present disclosure are capable of detonating upon reaction of the cation with the anion. In the energetic salts of the present disclosure, the oxidizer (oxidizing anion) and fuel (organic cation) are brought together in a single energetic salt. The salt can then be detonated or controllably decomposed. In some embodiments, the reaction of the cation with the anion is triggered or initiated by pressure or temperature. In some embodiments, the reaction is triggered by crushing the energetic salt or a composition containing the energetic salt. In some embodiments, the reaction is triggered by heating the energetic salt, or a composition containing the energetic salt, to a temperature of about 90° C. or higher, for example, about 100° C. or higher, about 150° C. or higher, about 200° C. or higher, about 250° C. or higher, about 300° C. or higher, about 350° C. or higher, or about 400° C. or higher. In some embodiments, the reaction is triggered by heating the energetic salt, or a composition containing the energetic salt, to a temperature between about 100° C. and about 400° C., about 100° C. and about 350° C., about 100° C. and about 300° C., about 100° C. and about 250° C., about 100° C. and about 200° C., about 100° C. and about 150° C., about 150° C. and about 400° C., about 150° C. and about 350° C., about 150° C. and about 300° C., about 150° C. and about 250° C., about 150° C. and about 200° C., about 200° C. and about 400° C., about 200° C. and about 350° C., about 200° C. and about 300° C., about 200° C. and about 250° C., about 250° C. and about 400° C., about 250° C. and about 350° C., about 250° C. and about 300° C., about 300° C. and about 400° C., about 300° C. and about 350° C., about 350° C. and about 400° C., or about 100° C., about 125° C., about 150° C., about 175° C., about 190° C., about 200° C., about 225° C., about 235° C., about 250° C., about 275° C., about 300° C., about 325° C., about 350° C., about 375° C., or about 400° C. In some embodiments, the reaction is triggered by heating the energetic salt, or a composition containing the energetic salt, to a temperature of about 90° C. or higher. In some embodiments, the reaction is triggered by heating the energetic salt, or a composition containing the energetic salt, to a temperature of about 100° C. or higher. In some embodiments, the reaction is triggered by heating the energetic salt, or a composition containing the energetic salt, to a temperature of about 190° C. or higher. In some embodiments, the reaction is triggered by heating the energetic salt, or a composition containing the energetic salt, to a temperature of about 235° C. or higher. In some embodiments, the reaction is triggered by heating the energetic salt, or a composition containing the energetic salt, to a temperature of about 275° C. or higher.

In some embodiments, the energetic salt is a chlorate or bromate salt. Chlorate and bromate salts decompose into chloride and bromide, respectively, with evolution of oxygen. Typically, these decompositions occur at temperatures in excess of 300° C. Acids of chlorate and bromate, for example, $HClO_3$ and $HBrO_3$, are highly unstable and decompose to oxygen, chlorine or bromine, and water. In the case of the energetic salts of the present disclosure, the decomposition can be triggered by the deprotonation of the organic cation by the oxidizing anion. Scheme 1 depicts the initiation of decomposition of an exemplary energetic salt of the present disclosure.

Scheme 1.

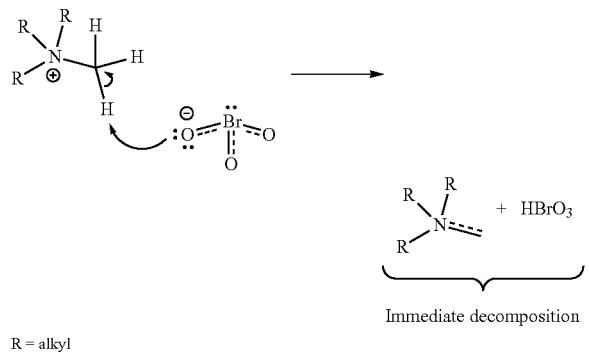

R = alkyl

The acid formed from this deprotonation (corresponding to $HBrO_3$ in Scheme 1) then rapidly oxidizes the unstable nitrogen-containing byproduct to a mixture of gases. Without wishing to be bound by any particular theory, it is believed that a well-defined molecular process is occurring, as different cations experience this process at different, well-defined temperatures. Other oxidizing anions can be expected to react with the organic cations similarly. In some embodiments, the organic cations form volatile products upon oxidation by the anion, and the oxidizing anion is converted into gaseous products as well. In some embodiments, the entire energetic salt decomposes completely to a significantly greater number of molar equivalents of gas relative to the number of moles of starting salt. In some embodiments, reaction and gas formation occurs instantaneously. Because the decomposition pathway has a well-defined molecular origin, the decomposition can be achieved across the entire sample essentially simultaneously, provided a thermal threshold is reached. In some embodiments, at a threshold temperature, the energetic salts of the present disclosure decompose rapidly and exothermically with gas evolution. In some embodiment, the reactions occur supersonically.

In some embodiments, decomposition parameters depend on which cation/anion pair is present in the energetic salt. Some cation/anion pairs will have more or less explosivity and will decompose at different rates. In some embodiments, salts with slower decomposition rates can be used as propellants for ballistics. In other embodiments, salts with faster decomposition rates can be used as demolition explosives.

The energetic salts can have any suitable velocity of detonation. For example, the energetic salts can have a velocity of detonation of about 4 km/s to about 20 km/s, or about 8.5 km/s to about 20 km/s, or about 4 km/s or less, or about 4.5 km/s, about 5 km/s, about 5.5 km/s, about 6 km/s, about 6.5 km/s, about 7 km/s, about 7.5 km/s, about 8 km/s, about 8.5 km/s, about 9 km/s, about 9.5 km/s, about 10 km/s, about 10.5 km/s, about 11 km/s, about 11.5 km/s, about 12 km/s, about 12.5 km/s, about 13 km/s, about 13.5 km/s, about 14 km/s, about 14.5 km/s, about 15 km/s, about 16 km/s, about 17 km/s, about 18 km/s, about 19 km/s, or about 20 km/s or more.

Compositions Containing Energetic Salts

Also provided in the present disclosure are compositions containing the energetic salts of the present disclosure and a fluid. In some embodiments, the fluid is a fracturing fluid. In some embodiments, the energetic salt is encapsulated, dissolved in the fluid, or dispersed as a slurry.

In some embodiments, the energetic salt is encapsulated. For example, the energetically salt can be enterically coated. In some embodiments, the enteric coating is a polymeric coating selected from the group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

In some embodiments, the fluid is selected from the group consisting of an aqueous fluid, supercritical $CO_2$, a foam, and an emulsion. In some embodiments, the fluid is a fracturing fluid. In some embodiments, the fluid is an aqueous fluid. Suitable aqueous-based fluids include, but are not limited to, fresh water; saltwater (for example, water containing one or more water-soluble salts dissolved therein); brine (for example, saturated salt water); seawater; and any combination thereof. In some embodiments, the fluid is an aqueous fracturing fluid. In some embodiments, the fluid is an aqueous fluid and the energetic salt is encapsulated.

In some embodiments, the fluid is supercritical $CO_2$. In some embodiments, the fluid is a fracturing fluid that is supercritical $CO_2$. In some embodiments, the fluid is supercritical $CO_2$ and the energetic salt is dissolved, dispersed as a slurry, or encapsulated.

In some embodiments, the fluid is a foam or an emulsion. In some embodiments, the foam or emulsion has an aqueous continuous phase and a discontinuous phase that contains $N_2$, $CO_2$, or natural gas. In some embodiments, the foam or emulsion has an aqueous dispersed phase and a continuous phase that contains $N_2$, $CO_2$, or natural gas. In some embodiments, the energetic salt is dissolved in the non-aqueous phase of a foam or emulsion. In some embodiments, the energetic salt is encapsulated and placed in either phase of a foam or emulsion.

In some embodiments, the composition containing a fluid and an energetic salt of the present disclosure contains about 0.1 ppg to about 10 ppg of the energetic salt, such as about 0.1 ppg to about 9.5 ppg, about 0.1 ppg to about 9 ppg, about 0.1 ppg to about 8.5 ppg, about 0.1 ppg to about 8 ppg, about 0.1 ppg to about 7.5 ppg, about 0.1 ppg to about 7 ppg, about 0.1 ppg to about 6.5 ppg, about 0.1 ppg to about 6 ppg, about 0.1 ppg to about 5.5 ppg, about 0.1 ppg to about 5 ppg, about 0.1 ppg to about 4.5 ppg, about 0.1 ppg to about 4 ppg, about 0.1 ppg to about 3.5 ppg, about 0.1 ppg to about 3 ppg, about 0.1 ppg to about 2.5 ppg, about 0.1 ppg to about 2 ppg, about 0.1 ppg to about 1.5 ppg, about 0.1 ppg to about 1 ppg, about 0.1 ppg to about 0.5 ppg, about 0.5 ppg to about 10 ppg, about 0.5 ppg to about 9.5 ppg, about 0.5 ppg to about 9 ppg, about 0.5 ppg to about 8.5 ppg, about 0.5 ppg to about 8 ppg, about 0.5 ppg to about 7.5 ppg, about 0.5 ppg to about 7 ppg, about 0.5 ppg to about 6.5 ppg, about 0.5 ppg to about 6 ppg, about 0.5 ppg to about 5.5 ppg, about 0.5 ppg to about 5 ppg, about 0.5 ppg to about 4.5 ppg, about 0.5 ppg to about 4 ppg, about 0.5 ppg to about 3.5 ppg, about 0.5 ppg to about 3 ppg, about 0.5 ppg to about 2.5 ppg, about 0.5 ppg to about 2 ppg, about 0.5 ppg to about 1.5 ppg, about 0.5 ppg to about 1 ppg, about 1 ppg to about 10 ppg, about 1 ppg to about 9.5 ppg, about 1 ppg to about 9 ppg, about 1 ppg to about 8.5 ppg, about 1 ppg to about 8 ppg, about 1 ppg to about 7.5 ppg, about 1 ppg to about 7 ppg, about 1 ppg to about 6.5 ppg, about 1 ppg to about 6 ppg, about 1 ppg to about 5.5 ppg, about 1 ppg to about 5 ppg, about 1 ppg to about 4.5 ppg, about 1 ppg to about 4 ppg, about 1 ppg to about 3.5 ppg, about 1 ppg to about 3 ppg, about 1 ppg to about 2.5 ppg, about 1 ppg to about 2 ppg, about 1 ppg to about 1.5 ppg, about 1.5 ppg to about 10 ppg, about 1.5 ppg to about 9.5 ppg, about 1.5 ppg to about 9 ppg, about 1.5 ppg to about 8.5 ppg, about 1.5 ppg to about 8 ppg, about 1.5 ppg to about 7.5 ppg, about 1.5 ppg to about 7 ppg, about 1.5 ppg to about 6.5 ppg, about 1.5 ppg to about 6 ppg, about 1.5 ppg to about 5.5 ppg, about 1.5 ppg to about 5 ppg, about 1.5 ppg to about 4.5 ppg, about 1.5 ppg to about 4 ppg, about 1.5 ppg to about 3.5 ppg, about 1.5 ppg to about 3 ppg, about 1.5 ppg to about 2.5 ppg, about 1.5 ppg to about 2 ppg, about 2 ppg to about 10 ppg, about 2 ppg to about 9.5 ppg, about 2 ppg to about 9 ppg, about 2 ppg to about 8.5 ppg, about 2 ppg to about 8 ppg, about 2 ppg to about 7.5 ppg, about 2 ppg to about 7 ppg, about 2 ppg to about 6.5 ppg, about 2 ppg to about 6 ppg, about 2 ppg to about 5.5 ppg, about 2 ppg to about 5 ppg, about 2 ppg to about 4.5 ppg, about 2 ppg to about 4 ppg, about 2 ppg to about 3.5 ppg, about 2 ppg to about 3 ppg, about 2 ppg to about 2.5 ppg, about 2.5 ppg to about 10 ppg, about 2.5 ppg to about 9.5 ppg, about 2.5 ppg to about 9 ppg, about 2.5 ppg to about 8.5 ppg, about 2.5 ppg to about 8 ppg, about 2.5 ppg to about 7.5 ppg, about 2.5 ppg to about 7 ppg, about 2.5 ppg to about 6.5 ppg, about 2.5 ppg to about 6 ppg, about 2.5 ppg to about 5.5 ppg, about 2.5 ppg to about 5 ppg, about 2.5 ppg to about 4.5 ppg, about 2.5 ppg to about 4 ppg, about 2.5 ppg to about 3.5 ppg, about 2.5 ppg to about 3 ppg, about 3 ppg to about 10 ppg, about 3 ppg to about 9.5 ppg, about 3 ppg to about 9 ppg, about 3 ppg to about 8.5 ppg, about 3 ppg to about 8 ppg, about 3 ppg to about 7.5 ppg, about 3 ppg to about 7 ppg, about 3 ppg to about 6.5 ppg, about 3 ppg to about 6 ppg, about 3 ppg to about 5.5 ppg, about 3 ppg to about 5 ppg, about 3 ppg to about 4.5 ppg, about 3 ppg to about 4 ppg, about 3 ppg to about 3.5 ppg, about 3.5 ppg to about 10 ppg, about 3.5 ppg to about 9.5 ppg, about 3.5 ppg to about 9 ppg, about 3.5 ppg to about 8.5 ppg, about 3.5 ppg to about 8 ppg, about 3.5 ppg to about 7.5 ppg, about 3.5 ppg to about 7 ppg, about 3.5 ppg to about 6.5 ppg, about 3.5 ppg to about 6 ppg, about 3.5 ppg to about 5.5 ppg, about 3.5 ppg to about 5 ppg, about 3.5 ppg to about 4.5 ppg, about 3.5 ppg to about 4 ppg, about 4 ppg to about 10 ppg, about 4 ppg to about 9.5 ppg, about 4 ppg to about 9 ppg, about 4 ppg to about 8.5 ppg, about 4 ppg to about 8 ppg, about 4 ppg to about 7.5 ppg, about 4 ppg to about 7 ppg, about 4 ppg to about 6.5 ppg, about 4 ppg to about 6 ppg, about 4 ppg to about 5.5 ppg, about 4 ppg to about 5 ppg, about 4 ppg to about 4.5 ppg, about 4.5 ppg to about 10 ppg, about 4.5 ppg to about 9.5 ppg, about 4.5 ppg to about 9 ppg, about 4.5 ppg to about 8.5 ppg, about 4.5 ppg to about 8 ppg, about 4.5 ppg to about 7.5 ppg, about 4.5 ppg to about 7 ppg, about 4.5 ppg to about 6.5 ppg, about 4.5 ppg to about 6 ppg, about 4.5 ppg to about 5.5 ppg, about 4.5 ppg to about 5 ppg, about 5 ppg to about 10 ppg, about 5 ppg to about 9.5 ppg, about 5 ppg to about 9 ppg, about 5 ppg to about 8.5 ppg, about 5 ppg to about 8 ppg, about 5 ppg to about 7.5 ppg, about 5 ppg to about 7 ppg, about 5 ppg to about 6.5 ppg, about 5 ppg to about 6 ppg, about 5 ppg to about 5.5 ppg, about 5.5 ppg to about 10 ppg, about 5.5 ppg to about 9.5 ppg, about 5.5 ppg to about 9 ppg, about 5.5 ppg to about 8.5 ppg, about 5.5 ppg to about 8 ppg, about 5.5 ppg to about 7.5 ppg, about 5.5 ppg to about 7 ppg, about 5.5 ppg to about 6.5 ppg, about 5.5 ppg to about 6 ppg, about 6 ppg to about 10 ppg, about 6 ppg to about 9.5 ppg, about 6 ppg to about 9 ppg, about 6 ppg to about 8.5 ppg, about 6 ppg to about 8 ppg, about 6 ppg to about 7.5 ppg, about 6 ppg to about 7 ppg, about 6 ppg to about 6.5 ppg, about 6.5 ppg to about 10 ppg, about 6.5 ppg to about 9.5 ppg, about 6.5 ppg to about 9 ppg, about 6.5 ppg to about 8.5 ppg, about 6.5 ppg to about 8 ppg, about 6.5 ppg to about 7.5 ppg, about 6.5 ppg to about 7 ppg, about 7 ppg to about 10 ppg, about 7 ppg to about 9.5 ppg, about 7 ppg to about 9 ppg, about 7 ppg to about 8.5 ppg, about 7 ppg to about 8 ppg, about 7 ppg to about 7.5 ppg, about 7.5 ppg to about 10 ppg, about 7.5 ppg to about 9.5 ppg, about 7.5 ppg to about 9 ppg, about 7.5 ppg to about 8.5 ppg, about 7.5 ppg to about 8 ppg, about 8 ppg to about 10 ppg, about 8 ppg to about 9.5 ppg, about 8 ppg to about 9 ppg, about 8 ppg to about 8.5 ppg, about 8.5 ppg to about 10 ppg, about 8.5 ppg to about 9.5 ppg, about 8.5 ppg to about 9 ppg, about 9 ppg to about 10 ppg, about 9 ppg to about 9.5 ppg, about 9.5 ppg to about 10 ppg, or about 0.1 ppg, about 0.5 ppg, about 1 ppg, about 1.5 ppg, about 2 ppg, about 2.5 ppg, about 3 ppg, about 3.5 ppg, about 4 ppg, about 4.5 ppg, about 5 ppg, about 5.5 ppg, about 6 ppg, about 6.5 ppg, about 7 ppg, about 7.5 ppg, about 8 ppg, about 8.5 ppg, about 9 ppg, about 9.5 ppg, or about 10 ppg.

In some embodiments, the composition contains one or more additives. In some embodiments, the one or more additives are selected from the group consisting of a polymer, a surfactant, a crosslinking agent, a breaker, a clay inhibitor, a corrosion inhibitor, a scale inhibitor, a flowback aid, and a biocide, and combinations thereof.

Methods of Using Energetic Salts

Provided in this disclosure are methods of using an energetic salt of the present disclosure or a composition containing an energetic salt of the present disclosure. In some embodiments, the energetic salts are used as explosives or solid propellants. Because of the close proximity of the organic cation and oxidizing anion in the energetic salt, there is a controlled molecular basis for reaction between the cation and anion, which differs from the bulk phenomena typically observed in known propellant or explosive formulations.

Provided in the present disclosure are methods of treating a subterranean formation. In some embodiments, the method includes providing a composition containing an energetic salt of the present disclosure to a subterranean formation; and triggering a reaction between the cation and the anion of the energetic salt, where the energetic salt detonates. The providing of the composition can occur above the surface. The providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing, and can include any suitable contacting between the subterranean formation and the composition.

The method includes detonating at least some of the energetic salt downhole. The detonating can occur at any suitable time with respect to the placing of the composition in the subterranean formation or the contacting of the subterranean formation and the composition, such as at least one of before, during, and after the contacting or placing. The detonating is sufficient to generate at least one compression wave downhole. The detonation of the salts can be used for any suitable purpose. In some embodiments, the compression wave formed by the detonation can be used to create fractures downhole, to enlarge fractures downhole, or to otherwise manipulate material downhole toward the purpose of extracting petroleum from an adjacent subterranean formation. In some embodiments of the methods, detonation of the energetic salt creates fractures in the subterranean formation, provides a pressure pulse to the subterranean formation, breaks up deposits in the well that are impeding the flow of oil and gas, lowers the viscosity and encourages the flow of heavy oil in the subterranean formation, or combinations thereof. In some embodiments, the method is for hydraulic fracturing, pressure pulse fracturing, formation damage removal, lowering the viscosity of heavy oil, or combinations thereof.

The energetic salts of the present disclosure can be used in hydraulic fracturing. Hydraulic fracturing is a technique that includes placing or extending channels from the wellbore to the reservoir. This operation includes hydraulically injecting a fracturing fluid into a wellbore penetrating or adjacent to a petroleum-producing subterranean formation and forcing the fracturing fluid against the surrounding subterranean material by pressure. The subterranean material is forced to crack, creating or enlarging one or more fractures. Proppant can be placed in fractures to prevent or reduce closure. The fractures can provide flow or can provide improved flow of the recoverable fluids from the formation, such as petroleum materials.

Thus, provided is a method of hydraulic fracturing, the method including adding the energetic salt of the present disclosure, or a composition containing the energetic salt of the present disclosure, to a fracturing fluid and injecting the fracturing fluid into a subterranean formation; and triggering the energetic salt to release gases and heat. In some embodiments, the energetic salt is triggered by crushing the salt, impacting the salt with a surface, or heating the salt to a threshold temperature. In some embodiments, the threshold temperature is about 90° C. or higher. In some embodiments, the energetic salt is added to the fracturing fluid in a range of about 0.1 ppg to about 10 ppg and injected into the subterranean formation.

In some embodiments, detonation of the energetic salt provides a pressure pulse to the formation and creates fractures in the rock in sequence or in parallel with the fractures created by the hydraulic pressure of the fluid itself. In some embodiments, fractures are initially created in the rock via the hydraulic pressure of the fluid. In some embodiments, the energetic salt is placed deep within the fractures and then detonates to form additional fractures, creating a more complex fracture network. In some embodiments, due to the controllable detonation properties of the energetic salts of the present disclosure, it is possible for the salt to be placed deep in the fractures. In some embodiments, the salt is triggered to detonate when either the temperature of the fracturing fluid heats up due to the high temperature of the formation or the fractures close due to the hydraulic pressure being released from the surface.

In some embodiments, the energetic salt detonates on the time scale that the hydraulic fracture is formed. In some embodiments, the hydraulic fracture forms over a period of about 1 to about 3 hours. In some embodiments, detonation of the salt extends the fracture deeper into the formation.

In some embodiments, the energetic salt detonates early in the fluid injection process. In some embodiments, the energetic salt detonates within one hour of when the fluid injection process begins. In some embodiments, detonation creates notches or initiating fractures. In some embodiments, the hydraulic pressure from the fluid creates or extends the fractures deeper into the formation.

In some embodiments of the method, the fracturing fluid medium is aqueous, supercritical, a foam, or an emulsion. In some embodiments, the fracturing fluid is aqueous and the energetic salt is encapsulated. In some embodiments, the fracturing fluid is supercritical $CO_2$ and the energetic salt is either dissolved, dispersed as a slurry, or encapsulated. In some embodiments, the fracturing fluid is an emulsion or a foam and the energetic salt is dissolved in the non-aqueous phase. In some embodiments, the energetic salt is encapsulated and placed in either phase. In some embodiments, the foam or emulsion has an aqueous continuous phase with a discontinuous phase of $N_2$, $CO_2$, or natural gas. In some embodiments, the foam or emulsion has a continuous phase of $N_2$, $CO_2$, or natural gas and an aqueous dispersed phase.

In some embodiments, the fracturing fluid contains one or more of a polymer, surfactant, crosslinking agent, breaker, clay inhibitor, corrosion inhibitor, scale inhibitor, biocide, flowback aid, or combinations thereof.

Also provided are methods of pressure pulse fracturing using the energetic salts of the present disclosure. In some embodiments, the method includes suspending and delivering the energetic salt to a subterranean formation. In some embodiments, the energetic salt is triggered by crushing the salt, impacting the salt with a surface, heating the salt to a threshold temperature, or providing a pressure pulse to the formation and creating fractures in the rock. In some embodiments, the threshold temperature is about 90° C. or higher.

In some embodiments, a fluid is used to suspend and deliver about 0.1 ppg to about 10 ppg of the energetic salt to the subterranean formation. In some embodiments, the fluid medium is aqueous, supercritical $CO_2$, a foam, or an emulsion. In some embodiments, the fluid medium is aqueous and the energetic salt is encapsulated. In some embodiments, the fluid medium is supercritical $CO_2$ and the energetic salt is either dissolved, dispersed as a slurry, or encapsulated. In some embodiments, the fluid medium is an emulsion or a foam and the energetic salt is dissolved in the non-aqueous phase. In some embodiments, the energetic salt is encapsulated and placed in either phase. In some embodiments, the foam or emulsion has an aqueous continuous phase with a discontinuous phase of $N_2$, $CO_2$, or natural gas. In some embodiments, the foam or emulsion has a continuous phase of $N_2$, $CO_2$, or natural gas and an aqueous dispersed phase.

In some embodiments of the method, the energetic salt is mechanically delivered to the formation via non-fluid mechanism. In some embodiments, the non-fluid mechanism is a vehicle such as a perforating gun where it may act as the primary explosive material in the shape charges or as an additional source of heat and gas.

Also provided are methods of formation damage removal. In some embodiments, the method includes suspending the energetic salt of the present disclosure in a fluid and delivering the fluid containing the energetic salt to a subterranean formation.

In some embodiments, the energetic salt is triggered by crushing the salt, impacting the salt with a surface, or heating the salt to a threshold temperature. In some embodiments, the threshold temperature is about 90° C. or higher.

In some embodiments, detonation of the energetic salt creates a pressure pulse. In some embodiments, the pressure pulse that is created breaks up deposits in the well that are impeding the flow of oil and gas. In some embodiments, the deposits are composed of mineral scale, including, but not limited to, barium sulfate ($BaSO_4$), calcium carbonate ($CaCO_3$), and iron sulfide. In some embodiments, the deposits are organic in nature, for example, asphaltenes and paraffins that build up and prevent flow. In some embodiments, the pressure and heat created from triggering the energetic salts breaks the deposits into smaller, soluble molecules.

In some embodiments, a fluid is used to suspend and deliver about 0.1 ppg to about 5 ppg of the energetic salt to the subterranean formation. In some embodiments, the fluid medium is aqueous, supercritical $CO_2$, a foam, or an emulsion. In some embodiments, the fluid medium is aqueous and the energetic salt is encapsulated. In some embodiments, the fluid medium is supercritical $CO_2$ and the energetic salt is either dissolved, dispersed as a slurry, or encapsulated. In some embodiments, the fluid medium is an emulsion or a foam and the energetic salt is dissolved in the non-aqueous phase. In some embodiments, the energetic salt is encapsulated and placed in either phase. In some embodiments, the foam or emulsion has an aqueous continuous phase with a discontinuous phase of $N_2$, $CO_2$, or natural gas. In some embodiments, the foam or emulsion has a continuous phase of $N_2$, $CO_2$, or natural gas and an aqueous dispersed phase.

Also provided are methods of lowering the viscosity of heavy oil. In some embodiments, the method includes suspending the energetic salt of the present disclosure in a fluid and delivering the fluid containing the energetic salt to a subterranean formation.

In some embodiments, the energetic salt is triggered by crushing the salt, impacting the salt with a surface, or heating the salt to a threshold temperature. In some embodiments, the threshold temperature is about 90° C. or higher.

In some embodiments, detonation of the energetic salt heats heavy oil in the subterranean formation, thereby lowering the viscosity and encouraging the flow of the oil to the surface.

In some embodiments, a fluid is used to suspend and deliver about 0.1 ppg to about 10 ppg of the energetic salt to the subterranean formation. In some embodiments, the fluid medium is aqueous, supercritical $CO_2$, a foam, or an emulsion. In some embodiments, the fluid medium is aqueous and the energetic salt is encapsulated. In some embodiments, the fluid medium is supercritical $CO_2$ and the energetic salt is either dissolved, dispersed as a slurry, or encapsulated. In some embodiments, the fluid medium is an emulsion or a foam and the energetic salt is dissolved in the non-aqueous phase. In some embodiments, the energetic salt is encapsulated and placed in either phase. In some embodiments, the foam or emulsion has an aqueous continuous phase with a discontinuous phase of $N_2$, $CO_2$, or natural gas. In some embodiments, the foam or emulsion has a continuous phase of $N_2$, $CO_2$, or natural gas and an aqueous dispersed phase.

EXAMPLES

Synthesis of Alkylammonium Compounds

The alkylammonium bromates and chlorates were synthesized by a double-displacement reaction of $[R_4N]_2SO_4$ with $Ba(XO_3)_2$ to yield $[R_4N]_2XO_3$ and $BaSO_4$ (where R is H or alkyl and X is Br or Cl). The alkylammonium compounds $[Bu_4N]BrO_3$, $[Bu_3NH]BrO_3$, $[Bu_2NH_2]BrO_3$, and $[BuNH_3]BrO_3$ (Bu=Butyl) were prepared.

$[Bu_4N]BrO_3$: To 100 mL of deionized water (DI $H_2O$) in a 250 milliliter (mL) Erlenmeyer flask was added 0.9 grams (g) of barium bromate ($Ba(BrO_3)_2$) (2.29 millimoles (mmol)), and the mixture was stirred. To this was added 2.66 g of a 50% weight by weight (w/w) tetrabutylammonium sulfate solution (2.29 mmol). The mixture instantly turned a milky white and was allowed to stir for 3 hours (h) and then allowed to stand for 20 h before filtering to remove the $BaSO_4$. Yield: 1.66 g (99% yield). IR ($cm^{-1}$), $\upsilon$=2950 (vs), 2905 (vs), 2840 (vs), 2740 (w), 2100 (w, br), 1650 (s), 1480 (vs), 1385 (s) 1290 (w), 1250 (w), 1170 (m), 1100 (s) 1060 (s) 1020 (m), 880 (s), 800 (vs). Melting point (m.p.) 54° C.

The TGA decomposition profile of $[Bu_4N]BrO_3$ under argon was obtained and is shown in FIG. 1. A rapid, exothermic decomposition with nearly complete, instantaneous mass loss was observed at 191.5° C.

$[Bu_3NH]BrO_3$: To 20 mL of DI $H_2O$ in a 125 mL Erlenmeyer flask was added 0.5 mL (2.1 mmol) of tributylamine. To this mixture was added 57 microliters (μL) of 98% sulfuric acid ($H_2SO_4$) (1.1 mmol) and the resulting mixture sonicated for 5 minutes. Separately, 0.42 g (1.1 mmol) of barium bromate were added to 80 mL of DI $H_2O$ and sonicated for 5 minutes to encourage dissolution. The tributylammonium sulfate solution was then added to the barium bromate solution with rapidity. The resulting mixture was sonicated for 30 minutes and vacuum filtered twice to give a clear solution from which the water was removed under vacuum. The product was a colorless liquid at room temperature. IR ($cm^{-1}$), $\upsilon$=3430 (m, br), 2960 (st), 2935 (m), 2873 (m), 1722 (vw), 1628 (m), 1460 (m), 1381 (w), 1066 (w), 786 (vs, sh), 768 (vs), 740 (s, sh).

$[Bu_2NH_2]BrO_3$: To 20 mL of DI $H_2O$ in a 125 mL Erlenmeyer flask was added 0.5 mL (3.3 mmol) of dibutylamine. To this mixture was added 88 μL of 98% $H_2SO_4$ (1.6 mmol) and the resulting mixture sonicated for 5 minutes. Separately, 0.64 g (1.6 mmol) of barium bromate was added to 80 mL of DI $H_2O$ and sonicated for 5 minutes to encourage dissolution. The dibutylammonium sulfate solution was then added to the barium bromate solution with rapidity. The resulting mixture was sonicated for 30 minutes and vacuum filtered twice to give a clear solution from which the water was removed under vacuum. The product was a colorless liquid at room temperature. m.p.: 4° C. IR (cm$^{-1}$), υ=3430 (m, br), 2960 (st), 2935 (m), 2873 (m), 1722 (vw), 1628 (m), 1617 (m), 1460 (m), 1381 (w), 1066 (w), 915 (w), 780 (vs), 727 (vs).

[BuNH$_3$]BrO$_3$: To 20 mL of DI H$_2$O in a 125 mL Erlenmeyer flask was added 0.33 mL (3.3 mmol) of butylamine. To this mixture was added 88 μL of 98% H$_2$SO$_4$ (1.6 mmol) and the resulting mixture sonicated for 5 minutes. Separately, 0.64 g (1.6 mmol) of barium bromate was added to 80 mL of DI H$_2$O and sonicated for 5 minutes to encourage dissolution. The butylammonium sulfate solution was then added to the barium bromate solution with rapidity. The resulting mixture was sonicated for 30 minutes and vacuum filtered twice to give a clear solution from which the water was removed under vacuum. Yield: 0.65 g (97%). IR (cm$^{-1}$), υ=3041 (st, br), 2960 (st), 2935 (m), 2875 (m), 1606 (m), 1600 (m), 1570 (s), 1174 (m), 1077 (m), 915 (m), 830 (vs), 768 (vs), 757 (vs).

[Bu$_4$N]ClO$_3$: To 100 mL of DI H$_2$O in a 250 mL Erlenmeyer flask was added 0.76 g of Ba(ClO$_3$)$_2$ (2.29 mmol), and the mixture was stirred. To this was added 2.66 g of a 50% w/w tetrabutylammonium sulfate solution (2.29 mmol). The mixture instantly turned a milky white and was allowed to stir for 3 h and then allowed to stand for 20 h before filtering to remove the BaSO$_4$. Yield: 0.73 g (98% yield). IR (cm$^{-1}$), υ=2960 (m), 2935 (m), 2875 (m), 1476 (w), 1472 (w), 1381 (w), 1650 (s), 954 (vs), 930 (vs), 881 (m), 800 (w), 740 (m). m.p. 116-118° C.

[PPN]BrO$_3$: 4.0 g of NaBrO$_3$ (26.5 mmol) was dissolved in 30 mL of deionized H$_2$O in a 120 mL glass tube. To this solution was added 1.0 g [PPN]Cl (1.86 mmol) and the solution heated at 100° C. for 15 minutes without stirring. Over the course of this time, a liquid formed and collected at the bottom of the tube. Upon cooling, this material crystallized and was isolated by filtration. Recrystallization of this material in 15 mL DI H$_2$O yielded 0.88 g of [PPN]BrO$_3$ (71% yield). IR (cm$^{-1}$), υ=3170 (w) 3150 (w) 3040 (s) 3010 (s), 2990 (s) 2700 (w) 2600 (w) 2230 (w) 2100 (w), 2080 (w), 2050 (w) 2000 (w), 1900 (w), 1830 (w), 1800 (w), 1780 (w) 1670 (w) 1600 (vs), 1480 (vs), 1420 (vs) 1300 (vs, br), 1190 (vs) 1100 (vs), 1020 (vs), 1000 (vs) 930 (w), 840 (vs), 790 (vs). m.p. 236-238° C. (dec.).

Figure 2:
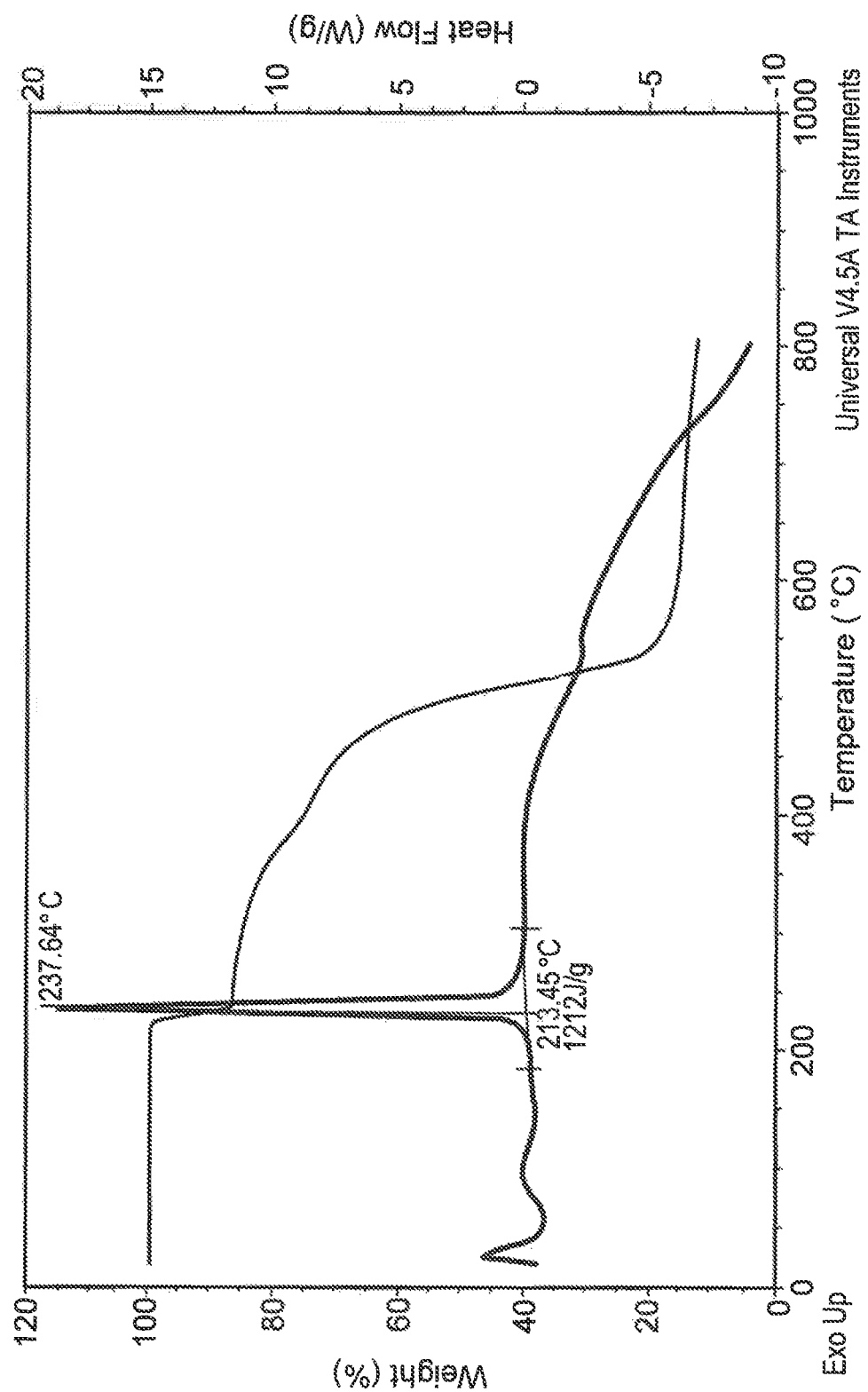
FIG. 2 shows the TGA decomposition profile of [PPN]BrO$_3$ under argon.

The TGA decomposition profile of [PPN]BrO$_3$ under argon was obtained and is shown in FIG. 2. An exothermic decomposition was observed at 237.6° C.

[PPN]ClO$_3$: 0.9 g of KClO$_3$ (7.43 mmol) was dissolved in 25 mL of deionized H$_2$O in a 120 mL glass tube. To this solution was added 1.0 g [PPN]Cl (1.86 mmol) and the solution heated at 100° C. for 20 minutes. Upon cooling, the solution precipitated a large amount of white solid which was the isolated by filtration. This solid was recrystallized in 15 mL DI H$_2$O yielding 0.96 g of [PPN]ClO$_3$ (83% yield). IR (cm$^{-1}$), υ=3180 (w), 3150 (w), 3090 (s), 3060 (s), 3020 (m), 2990 (m), 2970 (w), 2700 (w), 2230 (w), 2080 (w), 1990 (w), 1900 (m), 1840 (w), 1780 (w), 1680 (w), 1590 (s), 1480 (vs), 1440 (vs), 1330 (vs), 1240 (vs), 1190 (vs), 1105 (vs), 1020 (vs), 970 (vs), 850 (m), 810 (vs). m.p. 237° C. (dec.).

Figure 3:
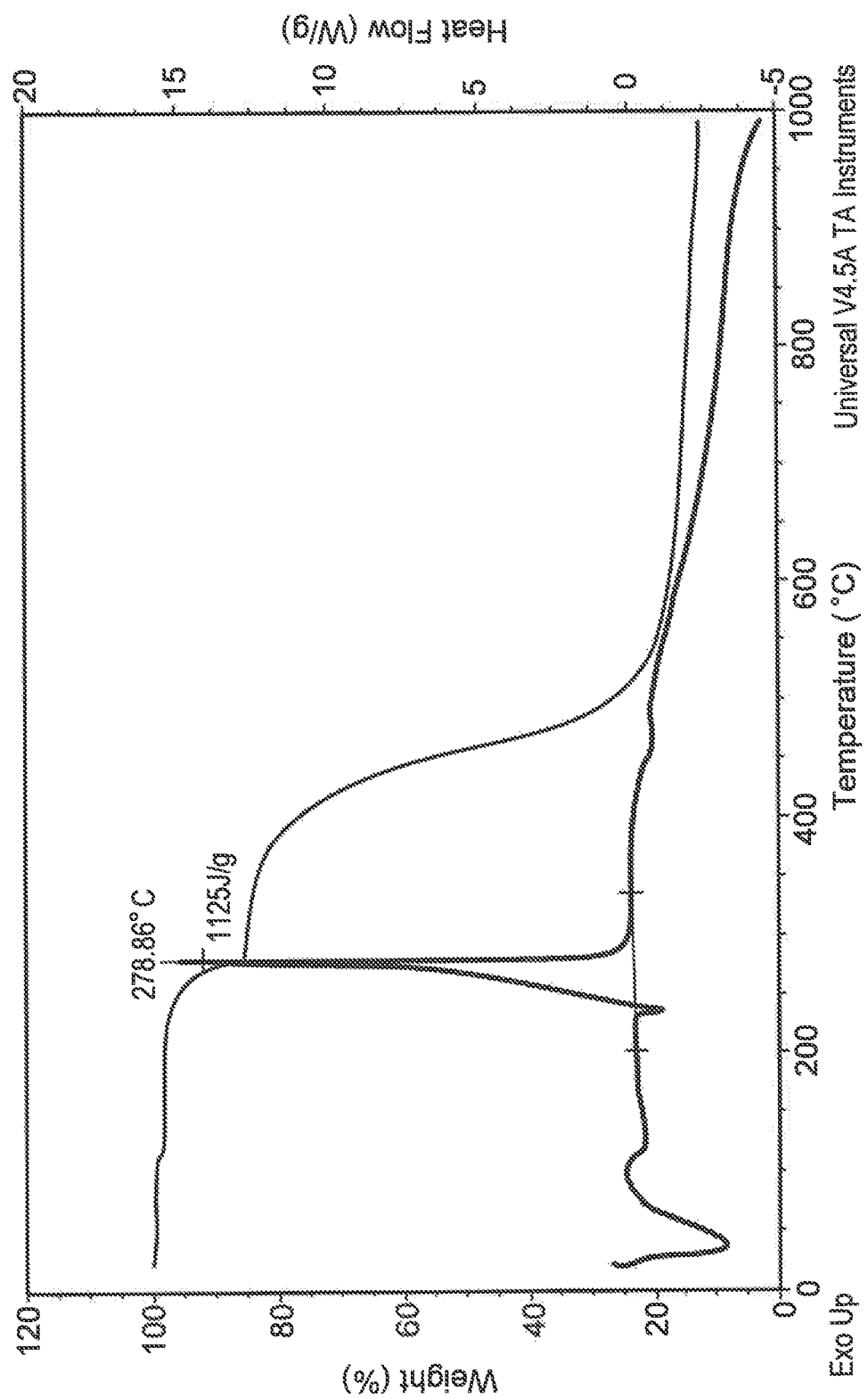
FIG. 3 shows the TGA decomposition profile of [PPN]ClO$_3$ under argon.

The TGA decomposition profile of [PPN]ClO$_3$ under argon was obtained and is shown in FIG. 3. An exothermic decomposition was observed at 278.9° C.

[PyrH]BrO$_3$, Pyr=pyridine: To 10 mL of DI H$_2$O was added 0.53 mL pyridine (6.6 mmol) followed by 180 μL of concentrated H$_2$SO$_4$ and stirred for two hours. This was then added to a solution of 1.3 g Ba(BrO$_3$)$_2$ in 120 mL of water and the resulting mixture sonicated for two hours. The mixture was allowed to settle, vacuum filtered, and the water removed via rotovap. Yield: 1.36 g of colorless liquid (98%).

What is claimed is:

1. An energetic salt comprising:
   an organic cation, wherein the organic cation is selected from the group consisting of quaternary ammonium salts (NR$^+_4$), ternary ammonium salts (NHR$_3^+$), secondary ammonium salts (NH$_2$R$_2^+$), primary ammonium salts (NH$_3$R$^+$), quaternary phosphonium salts (PR$_4^+$), ternary phosphonium salts (PHR$_3^+$), secondary phosphonium salts (PH$_2$R$_2^+$), primary phosphonium salts (PH$_3$R$^+$), sulfonium salts (SR$_3^+$), bis(triphenylphosphine)iminium (PPN) salts, imidazolium salts, pyridinium salts, pyrrolidinium salts, and derivatives thereof; wherein each R group is independently selected from the group consisting of a C$_1$-C$_8$ alkyl group, a 4 to 8-membered aryl, a 4 to 8-membered heteroaryl having 1 to 5 heteroatoms independently selected from the group consisting of N, O, and S, and a 4 to 8-membered heterocycle having 1 to 5 heteroatoms independently selected from the group consisting of N, O, and S; and
   an oxidizing anion;
   wherein the energetic salt is neat; and
   wherein the energetic salt is capable of detonation upon reaction of the organic cation with the oxidizing anion.

2. The energetic salt of claim 1, wherein the energetic salt is metal-free.

3. The energetic salt of claim 1, wherein the reaction of the organic cation with the organic anion is triggered by pressure or heat.

4. The energetic salt of claim 3, wherein the reaction is triggered by crushing the energetic salt.

5. The energetic salt of claim 3, wherein the reaction is triggered by heating the energetic salt to a temperature of about 90° C. or higher.

6. The energetic salt of claim 1, wherein the reaction of the organic cation with the oxidizing anion produces volatile gaseous products.

7. The energetic salt of claim 1, wherein the organic cation is selected from the group consisting of quaternary ammonium salts (NR$_4^+$), ternary ammonium salts (NHR$_3^+$), secondary ammonium salts (NH$_2$R$_2^+$), primary ammonium salts (NH$_3$R$^+$), bis(triphenylphosphine)iminium (PPN) salts, pyridinium salts, and derivatives thereof.

8. The energetic salt of claim 1, wherein the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

9. The energetic salt of claim 1, wherein the oxidizing anion is selected from the group consisting of chlorate (ClO$_3^-$), bromate (BrO$_3^-$), chlorite (ClO$_2^-$), hypochlorite (ClO$^-$), perchlorate (ClO$_4^-$), iodate (IO$_3^-$), bromite (BrO$_2^-$), hypobromite (BrO$^-$), nitrite (NO$_2^-$), perbromate (BrO$_4^-$), periodate (IO$_4^-$), iodite (IO$_2^-$), and hypoiodite (IO$^-$).

10. The energetic salt of claim 9, wherein the oxidizing anion is selected from the group consisting of chlorate (ClO$_3^-$) and bromate (BrO$_3^-$).

11. The energetic salt of claim 1, wherein the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt and the oxidizing anion is selected from the group consisting of chlorate ($ClO_3^-$) and bromate ($BrO_3^-$).

12. The energetic salt of claim 11 selected from the group consisting of tetrabutylammonium bromate ([$Bu_4N$]$BrO_3$), tributylammonium bromate ([$Bu_3NH$]$BrO_3^-$), dibutylammonium bromate ([$Bu_2NH_2$]$BrO_3$), butylammonium bromate ([$BuNH_3$]$BrO_3$), tetrabutylammonium chlorate ([$Bu_4N$]$ClO_3$), bis(triphenylphosphine)iminium bromate ([PPN]$BrO_3$), bis(triphenylphosphine)iminium chlorate ([PPN]$ClO_3$), and pyridinium bromate ([PyrH]$BrO_3$).

13. A composition comprising:
a fluid; and
an energetic salt comprising:
an organic cation, wherein the organic cation is selected from the group consisting of quaternary ammonium salts ($NR_4^+$), ternary ammonium salts ($NHR_3^+$), secondary ammonium salts ($NH_2R_2^+$), primary ammonium salts ($NH_3R^+$), quaternary phosphonium salts ($PR_4^+$), ternary phosphonium salts ($PHR_3^+$), secondary phosphonium salts ($PH_2R_2^+$), primary phosphonium salts ($PH_3R^+$), sulfonium salts ($SR_3^+$), bis(triphenylphosphine)iminium (PPN) salts, imidazolium salts, pyridinium salts, pyrrolidinium salts, and derivatives thereof; wherein each R group is independently selected from the group consisting of a $C_1$-$C_8$ alkyl group, a 4 to 8-membered aryl, a 4 to 8-membered heteroaryl having 1 to 5 heteroatoms independently selected from the group consisting of N, O, and S, and a 4 to 8-membered heterocycle having 1 to 5 heteroatoms independently selected from the group consisting of N, O, and S; and
an oxidizing anion, wherein the oxidizing anion is selected from the group consisting of chlorate ($ClO_3^-$), bromate ($BrO_3^-$), chlorite ($ClO_2^-$), hypochlorite ($ClO^-$), perchlorate ($ClO_4^-$), iodate ($IO_3^-$), bromite ($BrO_2^-$), hypobromite ($BrO^-$), nitrite ($NO_2^-$), perbromate ($BrO_4^-$), periodate ($IO_4^-$), iodite ($IO_2^-$), and hypoiodite ($IO^-$);
wherein the energetic salt is neat; and
wherein the energetic salt is capable of detonation upon reaction of the organic cation with the oxidizing anion.

14. The composition of claim 13, wherein the fluid is selected from the group consisting of an aqueous fluid, supercritical $CO_2$, a foam, and an emulsion.

15. The composition of claim 14, wherein the foam or emulsion has an aqueous continuous phase and a discontinuous phase comprising $N_2$, $CO_2$, or natural gas.

16. The composition of claim 14, wherein the foam or emulsion has an aqueous dispersed phase and a continuous phase comprising $N_2$, $CO_2$, or natural gas.

17. The composition of claim 13, wherein the composition is metal-free.

18. The composition of claim 13, wherein the reaction of the organic cation with the oxidizing anion is triggered by pressure or heat.

19. The composition of claim 18, wherein the reaction is triggered by crushing the energetic salt.

20. The composition of claim 18, wherein the reaction is triggered by heating the energetic salt to a temperature of about 90° C. or higher.

21. The composition of claim 13, wherein the reaction of the organic cation with the oxidizing anion produces volatile gaseous products.

22. The composition of claim 13, wherein the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

23. The composition of claim 13, wherein the oxidizing anion is selected from the group consisting of chlorate ($ClO_3^-$) and bromate ($BrO_3^-$).

24. The composition of claim 13, wherein the energetic salt is selected from the group consisting of tetrabutylammonium bromate ([$Bu_4N$]$BrO_3$), tributylammonium bromate ([$Bu_3NH$]$BrO_3$), dibutylammonium bromate ([$Bu_2NH_2$]$BrO_3$), butylammonium bromate ([$BuNH_3$]$BrO_3$), tetrabutylammonium chlorate ([$Bu_4N$]$ClO_3$), bis(triphenylphosphine)iminium bromate ([PPN]$BrO_3$), bis(triphenylphosphine)iminium chlorate ([PPN]$ClO_3$), and pyridinium bromate ([PyrH]$BrO_3$).

25. The composition of claim 14, wherein the energetic salt is encapsulated, dissolved in the fluid, or dispersed as a slurry.

26. The composition of claim 25, wherein the energetic salt is encapsulated with a polymeric enteric coating selected from the group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

27. The composition of claim 13, wherein the composition contains about 0.1 ppg to about 10 ppg of the energetic salt.

28. The composition of claim 13, comprising one or more additives.

29. The composition of claim 28, wherein the one or more additives are selected from the group consisting of a polymer, a surfactant, a crosslinking agent, a breaker, a clay inhibitor, a corrosion inhibitor, a scale inhibitor, a flowback aid, a biocide, and combinations thereof.

30. A method of treating a subterranean formation, comprising:
providing to a subterranean formation a composition comprising an energetic salt comprising:
an organic cation, wherein the organic cation is selected from the group consisting of quaternary ammonium salts ($NR_4^+$), ternary ammonium salts ($NHR_3^+$), secondary ammonium salts ($NH_2R_2^+$), primary ammonium salts ($NH_3R^+$), quaternary phosphonium salts ($PR_4^+$), ternary phosphonium salts ($PHR_3^+$), secondary phosphonium salts ($PH_2R_2^+$), primary phosphonium salts ($PH_3R^+$), sulfonium salts ($SR_3^+$), bis(triphenylphosphine)iminium (PPN) salts, imidazolium salts, pyridinium salts, pyrrolidinium salts, and derivatives thereof; wherein each R group is independently selected from the group consisting of a $C_1$-$C_8$ alkyl group, a 4 to 8-membered aryl, a 4 to 8-membered heteroaryl having 1 to 5 heteroatoms independently selected from the group consisting of N, O, and S, and a 4 to 8-membered heterocycle having 1 to 5 heteroatoms independently selected from the group consisting of N, O, and S; and
an oxidizing anion;
wherein the energetic salt is neat; and
triggering a reaction between the organic cation and the oxidizing anion, wherein the energetic salt detonates.

31. The method of claim 30, wherein the composition is metal-free.

32. The method of claim 30, wherein the reaction of the organic cation with the oxidizing anion is triggered by pressure or heat.

33. The method of claim 32, wherein the reaction is triggered by crushing the energetic salt.

34. The method of claim 32, wherein the reaction is triggered by heating the energetic salt to a temperature of about 90° C. or higher or about 100° C. or higher.

35. The method of claim 30, wherein the reaction of the organic cation with the oxidizing anion produces volatile gaseous products.

36. The method of claim 30, wherein the organic cation is selected from the group consisting of a tetraalkylammonium salt, a trialkylammonium salt, a dialkylammonium salt, a primary alkylammonium salt, a pyridinium salt, and a bis(triphenylphosphine)iminium salt.

37. The method of claim 30, wherein the oxidizing anion is selected from the group consisting of chlorate ($ClO_3^-$), bromate ($BrO_3^-$), chlorite ($ClO_2^-$), hypochlorite ($ClO^-$), perchlorate ($ClO_4^-$), iodate ($IO_3^-$), bromite ($BrO_2^-$), hypobromite ($BrO^-$), nitrite ($NO_2^-$), perbromate ($BrO_4^-$), periodate ($IO_4^-$), iodite ($IO_2^-$), and hypoiodite ($IO^-$).

38. The method of claim 37, wherein the oxidizing anion is selected from the group consisting of chlorate ($ClO_3^-$) and bromate ($BrO_3^-$).

39. The method of claim 30, wherein the energetic salt is selected from the group consisting of tetrabutylammonium bromate ([$Bu_4N$]$BrO_3$), tributylammonium bromate ([$Bu_3NH$]$BrO_3$), dibutylammonium bromate ([$Bu_2NH_2$]$BrO_3$), butylammonium bromate ([$BuNH_3$]$BrO_3$), tetrabutylammonium chlorate ([$Bu_4N$]$ClO_3$), bis(triphenylphosphine)iminium bromate ([PPN]$BrO_3$), bis(triphenylphosphine)iminium chlorate ([PPN]$ClO_3$), and pyridinium bromate ([PyrH]$BrO_3$).

40. The method of claim 30, wherein the composition comprises a fluid selected from among an aqueous fluid, supercritical $CO_2$, a foam, and an emulsion.

41. The method of claim 40, wherein the energetic salt is encapsulated, dissolved in the fluid, or dispersed as a slurry.

42. The method of claim 40, wherein the energetic salt is encapsulated with a polymeric enteric coating selected from the group consisting of methylacrylate-methacrylic acid copolymers, cellulose acetate phthalate, cellulose acetate succinate, hydroxypropylmethyl cellulose phthalate, hypromellose acetate succinate, polyvinyl acetate phthalate, shellac, cellulose acetate trimellitate, sodium alginate, and zein.

43. The method of claim 30, wherein the composition contains about 0.1 ppg to about 10 ppg or about 0.1 ppg to about 5 ppg of the energetic salt.

44. The method of claim 30, comprising one or more additives.

45. The method of claim 44, wherein the one or more additives are selected from the group consisting of a polymer, a surfactant, a crosslinking agent, a breaker, a clay inhibitor, a corrosion inhibitor, a scale inhibitor, a flowback aid, a biocide, and combinations thereof.

46. The method of claim 30, wherein the method is for hydraulic fracturing, pressure pulse fracturing, formation damage removal, or lowering the viscosity of heavy oil.

47. The method of claim 30, wherein detonation of the energetic salt creates fractures in the subterranean formation, provides a pressure pulse to the subterranean formation, breaks up deposits in the well that are impeding the flow of oil and gas, lowers the viscosity and encourages the flow of heavy oil in the subterranean formation, and combinations thereof.

\* \* \* \* \*

UNITED STATES PATENT AND TRADEMARK OFFICE
CERTIFICATE OF CORRECTION

| | |
|---|---|
| PATENT NO. | : 11,492,541 B2 |
| APPLICATION NO. | : 16/709533 |
| DATED | : November 8, 2022 |
| INVENTOR(S) | : Desmond Schipper and Katherine Leigh Hull |

It is certified that error appears in the above-identified patent and that said Letters Patent is hereby corrected as shown below:

In the Claims

In Column 21, Line 7, Claim 12, please replace "([Bu$_3$NH]BrO$_3^-$)" with -- ([Bu$_3$NH]BrO$_3$) --.

Signed and Sealed this
Eleventh Day of April, 2023

Katherine Kelly Vidal
*Director of the United States Patent and Trademark Office*